United States Patent
Nagai et al.

(10) Patent No.: US 6,347,303 B2
(45) Date of Patent: *Feb. 12, 2002

(54) SYSTEM CONFIGURATION PROPOSAL METHOD AND TOOL THEREFOR

(75) Inventors: Yasuhiko Nagai, Bunkyo-ku; Yoshiyuki Nakayama, Kawasaki; Susumu Matsui, Machida, all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/164,579

(22) Filed: Oct. 1, 1998

(30) Foreign Application Priority Data

Oct. 2, 1997 (JP) .............................. 9-269922

(51) Int. Cl.[7] .............................. B65G 57/16

(52) U.S. Cl. .............................. 705/7; 705/10

(58) Field of Search .............................. 705/1, 7, 8, 9, 705/10; 717/1; 706/45; 703/6

(56) References Cited

U.S. PATENT DOCUMENTS

| | | | | |
|---|---|---|---|---|
| 5,408,607 A | * | 4/1995 | Nishikawa et al. | 709/218 |
| 5,493,489 A | * | 2/1996 | Tamaki et al. | 705/8 |
| 5,717,865 A | * | 2/1998 | Stratmann | 705/10 |
| 5,724,262 A | * | 3/1998 | Ghahramani | 702/186 |
| 5,734,837 A | * | 3/1998 | Flores et al. | 705/7 |
| 5,784,539 A | * | 7/1998 | Lenz | 706/45 |
| 5,890,133 A | * | 3/1999 | Ernst | 705/7 |

(List continued on next page.)

FOREIGN PATENT DOCUMENTS

| | | | | | |
|---|---|---|---|---|---|
| EP | 770967 A2 | * | 5/1997 | .......... | G06F/17/60 |
| JP | 2001109794 A | * | 4/2001 | .......... | G06F/17/60 |

OTHER PUBLICATIONS

"Workgroup Computing Report", vol. 18, No. 6, pp 2–15, 1996.

Kettinger, William J; Teng, James T C; Guha, Subashish. Business process change: A study of methodologies, techniques, and tools. MIS Quarterly [online], Mar. 1, 1997 [retrieved on Aug. 20, 2001], v21n1. Retrieved from Dialog Information Services, Palo Alto, CA, USA. Accession No. 01472447 , pp. 55–80.*

(List continued on next page.)

*Primary Examiner*—Tariq R. Hafiz
*Assistant Examiner*—D. Robertson
(74) *Attorney, Agent, or Firm*—Antonelli, Terry, Stout & Kraus, LLP

(57) ABSTRACT

A system configuration evaluation/proposal support method of supporting the effect evaluation of a support system for enhancing the business processing ability of a human and a system configuration proposal suitable to a business process, and a tool for the method are provided in the following manner. Data of a functional process model expressing a business process on a basic function element unit of information processing, a system configuration candidate constructed by a combination of an information system resource and a human resource, the degree of relationship between a functional process item and a related functional item provided by the system configuration candidate, the degree of importance of the functional process item, the degree of functional sufficiency of the provided functional item, and the degree of relationship of both items is defined. An operation for evaluating the functional support suitability of the system configuration candidate is executed by a mapping function calculation. A suitability analysis process, an analysis/evaluation result display process, and proposed system updating determination are performed.

35 Claims, 26 Drawing Sheets

U.S. PATENT DOCUMENTS

| | | | | |
|---|---|---|---|---|
| 5,903,478 | A | * 5/1999 | Fintel et al. | 395/500.27 |
| 5,909,669 | A | * 6/1999 | Havens | 705/11 |
| 5,974,392 | A | * 10/1999 | Endo | 705/8 |
| 6,002,396 | A | * 12/1999 | Davies | 345/339 |

OTHER PUBLICATIONS

Gaughan, Thomas R. The systems dimension of process re-engineering. CMA Magazine [online], Nov. 1, 1996 [retrieved on Aug. 21, 2001], v70n9, Retrieved from Dialog Information Services, Palo Alto, CA, USA. Accession No. 01335916, pp. 12–15.*

Dennis, Alan R; Daniels, Robert M Jr; Hayes, Glenda; Nunamaker, Jay F Jr. Methodology–driven use of automated support in business process re-engineering. Journal of Management Information Systems: JMIS [online], Winter 1993–1994 [retrieved on Aug. 21, 2001], v10n3. Retrieved from Dialog Information Services. Palo Alto, CA, USA. Accession No. 00847898, pp. 117–138.*

Conducting business technology planning. Managing Office Technology [online], Jul. 1, 1997 [retrieved on Aug. 21, 2001], v42n7. Retrieved from Dialog Information Services, Palo Alto, CA, USA. Accession No. 01520494, pp. 10–12.*

* cited by examiner

SYSTEM CONFIGURATION PROPOSAL SUPPORT TOOL

FIG. 4

RESOURCE LIBRARY REGISTRATION WINDOW

401 — RESOURCE LIBRARY REGISTRATION  
4091 — OK  
4092 — CANCEL  
4093 — HELP

RESOURCE TYPES
- 4011 ● INFORMATION SYSTEM RESOURCE
- 4012 ○ HUMAN RESOURCE
- 4013 ○ OTHER RESOURCES

402 — RESOURCE ATTRIBUTE

| | | |
|---|---|---|
| 4021 LARGE CLASSIFICATION | : | GROUPWARE ▽ |
| | DETAILED CLASSIFICATION | : ELECTRONIC MAIL ▽ |
| | | 4022 |
| 4023 NAME | : | XXXXXX |
| 4024 MODEL NAME | : | H970003CC/-B ▽ |
| 4025 SUPPLIER | : | AAA.Ltd |
| 4026 PRICE (¥) | : | 100,000 |

LIST OF PROVIDED FUNCTIONAL ITEMS

| FUNCTIONAL ITEMS | DEGREE OF FUNCTIONAL SUFFICIENCY |
|---|---|
| (1) MAIL RECEIVING FUNCTION | WELL AVAILABLE (0.75) |
| (2) MAIL RECEPTION NOTIFICATION FUNCTION | WELL AVAILABLE (0.75) |
| (3) MAIL FOLDER FUNCTION | AVAILABLE (0.5) |

403a — SELECT THE FUNCTIONAL ITEMS
- MAIL RECEPTION NOTIFICATION FUNCTION
- MAIL TEXT EDITION FUNCTION
- MAIL SENDING FUNCTION
- MAIL TRANSFER FUNCTION

405 — SELECT THE DEGREE OF SUFFICIENCY
- PERFECTLY AVAILABLE (1.0)
- WELL AVAILABLE (0.75)
- AVAILABLE (0.5)
- LITTLE AVAILABLE (0.25)
- UNAVAILABLE (0.0)

407 — ADD  
408 — DELETE

FIG. 10

SYSTEM CONFIGURATION CANDIDATE DEFINITION WINDOW

SYSTEM CONFIGURATION CANDIDATE DEFINITION  1008~ [OK] [CANCEL] [HELP]

─ NAME OF SYSTEM CONFIGURATION CANDIDATE TO BE EDITED ─────────────

HELP DESK SYSTEM 3

| REGISTRATION CANDIDATE LIST | RESOURCE LIST | FUNCTIONAL ITEMS | DEGREE OF FUNCTIONAL SUFFICIENCY |
|---|---|---|---|
| HELP DESK SYSTEM 1 | EXAMPLE DB SYSTEM | (1) MAIL RECEIVING FUNCTION | WELL AVAILABLE (0.75) |
| HELP DESK SYSTEM 2 | TELEPHONE | (2) MAIL RECEPTION NOTIFICA-TION FUNCTION | WELL AVAILABLE (0.75) |
| HELP DESK SYSTEM 3 | XX MAIL | (3) MAIL FOLDER FUNCTION | AVAILABLE (0.5) |

[ADD/ALTER] ~1001a
[DELETE] ~1001b

RESOURCE ADDITION / ALTERATION ~1002   [OK] [CANCEL] [HELP]

─ LIST OF SELECTING RESOURCES ───────────────

EXAMPLE / CORRESPONDING STATUS DATABASE ~1007
TELEPHONE

RETRIEVAL CONDITION ~1003
RESOURCE TYPES : ● INFORMATION SYSTEM RESOURCE  ○ HUMAN RESOURCE  ○ OTHER RESOURCES
LARGE CLASSIFICATION : [GROUPWARE ▼]  DETAILED CLASSIFICATION : [ELECTRONIC MAIL ▼]

CANDIDATE RESOURCE LIST ~1004

| | FUNCTIONAL ITEMS ~1005 | DEGREE OF FUNCTIONAL SUFFICIENCY |
|---|---|---|
| XX MAIL | (1) MAIL RECEIVING FUNCTION | WELL AVAILABLE (0.75) |
| YY MAIL | (2) MAIL RECEPTION NOTIFICA-TION FUNCTION | WELL AVAILABLE (0.75) |
| ZZ MAIL | (3) MAIL FOLDER FUNCTION | AVAILABLE (0.5) |

[ADD] ~1006a
[DELETE] ~1006b 1010
1020

FIG. 11

FUNCTIONAL PROCESS-SYSTEM PROVIDING FUNCTION RELATIONSHIP DEFINITION WINDOW

FUNCTIONAL PROCESS-SYSTEM PROVIDING FUNCTION RELATIONSHIP DEFINITION ~1101

| RELATIONSHIP (DEGREE) MATRIX | | | | SYSTEM ITEM NAME | XX MAIL | | |
|---|---|---|---|---|---|---|---|
| | | | | NAME OF PROVIDING FUNCTION ITEM | MAIL RECEIVING FUNCTION | MAIL RECEPTION NOTIFICATION FUNCTION | MAIL LIST DISPLAY FUNCTION |
| PROCESS ITEM NAME | TYPE | LEVEL | INTERACTIVE LOOP | DEGREE OF FUNCTIONAL SUFFICIENCY / DEGREE OF IMPORTANCE | 0.75 | 0.75 | 0.75 |
| JUDGE WHETHER OR NOT THERE IS AN ANSWER REQUESTED CASE | Personal | Skill | | 1.0 | 1.0 | 0.0 | 0.0 |
| NOTIFY THE ANSWER REQUESTED CASE TO THE PERSON IN CHARGE | Communication | Skill | | 0.75 | 0.0 | 1.0 (1106) | 0.0 |
| SET TO THE STATE THAT THE INQUIRED CASE IS UNDER INVESTIGATION | Personal | Skill | | 0.5 | | | |
| JUDGE AN UNCLEAR POINT IN THE INQUIRED CONTENT | Personal | Rule | | 1.0 | | | |
| ... | ... | ... | | ... | ... | ... | ... |

1100
[OK] [CANCEL] [HELP]

1102 RELATIONSHIP SETTING | INTERACTIVE LOOP 1201

<GIVING RELATIONSHIP>
PROCESS NAME ~1103
[NOTIFY THE ANSWER REQUESTED CASE TO THE PERSON IN CHARGE] ↔ [MAIL RECEPTION NOTIFICATION FUNCTION]

NAME OF PROVIDING FUNCTION

<DEGREE OF RELATIONSHIP SETTING> 1104
CORRESPONDS (1.0)
TIGHTLY RELATED (0.75)
RELATED (0.5)
A LITTLE RELATED (0.25)
NOT RELATED (0.0)

[SET] ~1105a
[DELETE] ~1105b

FIG. 12

FUNCTIONAL PROCESS-SYSTEM PROVIDING FUNCTION INTERACTIVE LOOP DEFINITION WINDOW

FUNCTIONAL PROCESS-SYSTEM PROVIDING FUNCTION RELATIONSHIP DEFINITION

| RELATIONSHIP (DEGREE) MATRIX | | | | SYSTEM ITEM NAME | | XX MAIL | |
|---|---|---|---|---|---|---|---|
| | | | | NAME OF PROVIDING FUNCTION ITEM | MAIL RECEIVING FUNCTION | MAIL RECEPTION NOTIFICATION FUNCTION | MAIL LIST DISPLAY FUNCTION |
| PROCESS ITEM NAME | TYPE | LEVEL | INTERACTIVE LOOP | DEGREE OF FUNCTIONAL SUFFICIENCY / DEGREE OF IMPORTANCE | 0.75 | 0.75 | 0.75 |
| JUDGE WHETHER OR NOT THERE IS AN ANSWER REQUESTED CASE | Personal | Skill | Human LOOP | 1.0 | 1.0 | 0.0 | 0.0 |
| NOTIFY THE ANSWER REQUESTED CASE TO THE PERSON IN CHARGE | Communication | Skill | Machine LOOP  1204 | 0.75 | 0.0 | 1.0 | 1.0 |
| SET TO THE STATE THAT THE INQUIRED CASE IS UNDER INVESTIGATION | Personal | Skill | | 0.5 | 0.0 | 0.0 | 0.0 |
| JUDGE AN UNCLEAR POINT IN THE INQUIRED CONTENT | Personal | Rule | | 1.0 | 0.0 | 0.0 | 0.0 |
| ... | ... | ... | | ... | ... | ... | ... |

RELATIONSHIP SETTING | INTERACTIVE LOOP  ~1201

<RELATIONSHIP DISPLAY> ~1202

PROCESS NAME: NOTIFY THE ANSWER REQUESTED CASE TO THE PERSON IN CHARGE

↔

RELATED FUNCTION NAME | SYSTEM ITEM NAME
MAIL RECEPTION NOTIFICATION FUNCTION | XX MAIL
MAIL LIST DISPLAY FUNCTION | XX MAIL

<LOOP SETTING> 1203
Machine LOOP
Human LOOP
Human-GUI LOOP
Human-Machine LOOP

SET ~1105a
DELETE ~1105b

OK   CANCEL   HELP

TYPES OF INTERACTION LOOP BETWEEN BUSINESS PROCESSES AND RESOURCES

FIG. 24

DISPLAY WINDOW FOR THE RESULT OF SYSTEM CONFIGURATION PROPOSAL

BUSINESS PROCESS ADAPTIVE SYSTEM : BUSINESS PROCESS ENTIRE VIEW
CONFIGURATION PROPOSAL TOOL

FILE (F)   EDIT (E)   DISPLAY (V)   TOOL (T)   HELP (H)

609 — COMMUNICATION OF THE ANSWER        GENERATION OF THE ANSWER — 610

DISPLAY FOR THE RESULT OF SYSTEM CONFIGURATION PROPOSAL — 2401

| PRIORITY ORDER | PROPOSED SYSTEM | DEGREE OF SUITABILITY WEIGHT = 0.5 | DEGREE OF EXCESSIVITY/DEFICIENCY OF FUNCTION WEIGHT = 0.2 | INTRODUCING COST WEIGHT = 0.3 | GENERAL EVALUATION |
|---|---|---|---|---|---|
| 1 | HELP DESK SYSTEM 1 | 0.35 | 0.36 | 0.34 | 0.35 |
| 2 | HELP DESK SYSTEM 2 | 0.44 | 0.32 | 0.16 | 0.33 |
| 3 | HELP DESK SYSTEM 3 | 0.21 | 0.32 | 0.50 | 0.32 |

OK   CANCEL   HELP

SYSTEM CONFIGURATION PROPOSAL METHOD AND TOOL THEREFOR

BACKGROUND OF THE INVENTION

1. Field of The Invention

The present invention relates to a method of evaluating the effects of a system for enhancing the business processing ability of a human and proposing a system configuration suitable to a business process and a (support) tool based on the method. More particularly, the invention relates to a system configuration evaluation and proposal supporting method of supporting a preliminary estimation of the effects of a system and a configuration proposal at a planning stage of construction/improvement of an information system, an SI (System Integration) support tool based on the method, a method of evaluating a functional suitability between a business process and an information system, and method and tool for proposing a system configuration based on the evaluation method.

2. Description of the Related Art

At the planning stage of construction/improvement of an information system, a system configuration evaluation/proposal supporting method for supporting preliminary estimation of the effects of a system and the configuration proposal and an SI (System Integration) support tool based on the method are necessary. Specifically, in a system improvement proposal, that is, system configuration proposal such as fitting, expansion, and shift of an existing system based on a business process analysis at a planning stage of an information system in an information system department of a company or the like, or in a system proposal when a solution provider provides consultation on configuration or an SI service for an information system based on a business process analysis to a customer, especially, consultation on configuration or an SI service not only for a conventional system for realizing rationalization and reduction in the number of workers by automatization but also for a business supporting type information system for realizing improvement in the performance of a business process using groupware, intranet/internet, CTI (Computer Telephony Integration), and the like, in order to support the introduction and proposal of an information system configuration having high investment effects by selecting and combining platforms and tools adapted to a business process whose configuration is to be proposed and the ability of a person in charge of the business from platform and tool groups having various functions, a method of evaluating the functional suitability between the business process and the information system and a system configuration proposal support tool based on the method are necessary.

In order to support the work at the planning stage of the configuration/improvement of an information system, various system planning methods and supporting tools are conventionally used, especially, the technique for supporting analysis and evaluation of a process by modelling a business process to be systemized as a process map by the expression of a hierarchical flowchart or network to simulate response time throughput, costs, and the like of the process has been proposed. The technique is described in literature such as "..IEEE transactions on systems, man and cybernetics", Vol. 26, No. 5, September, pp 572–582, 1996 and "Workgroup Computing Report", Vol. 18, No. 6, pp 3–15, 1996. The technique for supporting an upstream design process of the system from a business process definition is described in "Nikkei BP, An introduction to CIS database design", June, 1996. Further, the technique for evaluating the suitability of the function provided by a simulator to a task carried out by a driver during driving in an educational scene by using fuzzy relationship in order to support the design of the simulator for safety driving education of a vehicle, a two-wheeled vehicle, and the like is described in "IATSS Research", Vol. 17, No. 1, 1993.

The conventional techniques for supporting the analysis/evaluation of the business process or upstream design, however, perform quantitative evaluation of response time, throughput, costs, and the like by paying attention to only the evaluation of the configuration of a process or the process itself and do not analyze/evaluate influences on an information system as a means for executing the process and the process of the human processing ability. That is, in order to realize the present business process, it is indispensable to support the information technique and information system. However, there is no means for evaluating what effects supposed to be obtained by executing which support of arrangement of human resources and computerization to which part of the process and for evaluating if the support is sufficient. Consequently, even if a bottleneck on the process is found and the configuration of the process can be improved or reformed, association to a specific realization means depends on the ability of a person who analyzes and designs. It is therefore difficult to perform proper association and a work load is heavy.

In the association, from the necessity of a computerization support which can immediately deal with a change in a business strategy, present information systems are not developed as a ready-made product but rather a flexible system is constructed by combining a plurality of general tools as components. It is, however, difficult to effectively and efficiently select tools suited to a business process from a group of candidate tools having various features. Especially, in a future business environment which requires provision of original items and service oriented to a customer, competitiveness largely depends on a value obtained from a knowledgeable worker and depends on how successfully a system using groupware and intranet/internet for effectively supporting business communication, coordination, and collaboration of the workers can be realized.

The trend is being shifted from the conventional computerization support for rationalization and reduction in the number of workers by automatization to the computerization support for improving the business processing ability of a worker. It is therefore an important subject to evaluate the suitability among the process, the ability of the worker, and the information system and to configure a system on the basis of the evaluation.

According to the conventional techniques, since the support is insufficient and the techniques are not suitable for an effect evaluation of a new type of computerization support, there are problems such that information investment effects cannot be seen and it is difficult to perform effective tool selection, system configuration, and optimum arrangement of human resources.

On the other hand, the conventional technique of the simulator design support can evaluate the suitability between the task and system providing function. Since a system called a simulator for simulating a substance is used, necessary, support functional items can be presumed and evaluation regarding the functional items can be performed. The technique has, however, a problem such that the technique cannot be sufficiently applied to an object which requires one to systematically add new necessary functions having support effects like a case of evaluating a system in which although components of utilized tools exist, information, such as an information system configuration and arrangement of human resources for supporting a business process, does not exist.

That is, since the conventional system planning method and support tools are used to plan a system for rationalization and reduction in the number of workers by automatization, the method and tools cannot evaluate the effects and suitability of computerization support with respect to a support for planning of a support type information system at present and for improving the business processing ability using groupware and the like in the future. As a result, there is a problem such that the information investment effects do not appear, and it is difficult to effectively and efficiently select the tools and components of the system configuration elements suitable for the business process and to configure the system.

SUMMARY OF THE INVENTION

It is an object of the invention to provide a system configuration evaluation/proposal support method which can quantitatively evaluate the influences of a support information system and the ability of a related worker on a business process and system configuration proposal method and tool for SI support based on the method in order to evaluate the effects of a support system for enhancing the business processing ability of a human and to propose the system configuration suitable to a business process.

In order to achieve the object, according to the invention, there are provided a system configuration proposal method and tool in an information processing system, comprising the steps of:

defining a business process model expressing a business process whose system configuration is to be proposed, by a combination of functional processing items defined within an information frame and storing the business process model in an information storage;

setting the degree of importance of each of the functional processing items of the business process model;

defining a candidate of a system resource for carrying out the business process by a combination of functional items provided by the system resource and storing the candidate in the information storage;

setting the degree of functional sufficiency of each functional item provided by the system resource;

setting the degree of relationship between each of the functional processing items of the business process model and the functional items provided by the system resource;

calculating the degree of functional suitability of the candidate of the system resource on the basis of the degree of relationship, the degree of importance of the functional processing items of the business process model, and the degree of functional sufficiency of the functional items provided by the system resource; and determining the system configuration proposal by the candidate of the system resource on the basis of evaluation indices including the functional suitability, and/or generating an evaluation window in a display mode designated on the basis of the evaluation indices and outputting the window by an input/output device.

More specifically, according to the invention, there are provided system configuration proposal method and tool in an information processing system, comprising the steps of:

defining a functional process model expressing a functional processing item of a business process whose system configuration is to be proposed, by a combination of items in a basic function element unit of information processing and storing the functional process model in an information storage, said items in a basic function element unit being defined within an information frame;

setting the degree of importance of each of the basic function element items of the functional process model;

defining a candidate of a system resource for carrying out the functional process by a combination of functional items provided by the system resource and storing the candidate in the information storage;

setting the degree of functional sufficiency of each functional item provided by the system resource;

setting the degree of relationship between each of the basic function element items of the functional process model and the functional items provided by the system resource;

calculating the degree of functional suitability of the candidate of the system resource on the basis of the degree of relationship, the degree of importance of the basic function element items of the functional process model, and the degree of functional sufficiency of the functional items provided by the system resource; and determining the system configuration proposal by the candidate of the system resource on the basis of evaluation indices including the functional suitability, and/or generating an evaluation window in a display mode designated on the basis of the evaluation indices and outputting the window by an input/output device.

Embodiments of the above will be described as follows.

In order to achieve the object, according to a first embodiment of the invention, there is provided a method of supporting an evaluation of effects of a support system for enhancing the business processing ability of a human and a system configuration proposal suited to a business process, comprising:

a step of defining a functional process model expressing functional processing items of the business process whose system configuration is to be proposed, in a basic function element unit of information processing;

a step of receiving and defining a setting of the degree of importance of each of the function element items in the functional process;

a step of defining a candidate of an information system which is used as a means for carrying out the functional process by receiving designation of the functional items provided by the utilized information system and a human information processing function of human resources and combining the designated functional items;

a step of receiving and defining a setting of the degree of functional sufficiency of the provided functional items;

a step of receiving a setting for associating the element items of each functional process with the functional items provided by each system configuration candidate and defining the setting of the degree of relationship;

a step of executing an operation for obtaining an index for evaluating the degree of functional support suitability of the system configuration candidate by a predetermined function using the degree of relationship between the functional process item and the related functional item provided by the system configuration candidate, the degree of importance of the functional process item, and the degree of functional sufficiency of the provided functional item;

a step of generating and displaying an evaluation window in a designated display mode by using the calculated index; and a step of determining a system configuration to be proposed from the defined system configuration candidates.

With respect to all of the degrees of relationship between the functional process item and the related functional item provided by the system configuration candidate, the degree of importance of the functional process item, and the degree of functional sufficiency of the provided functional item, the setting contents can be defined by numerical values.

In the step of executing the calculation for obtaining indices for evaluating the functional support suitability of the system configuration candidate, the degree of attainment of the element item of each functional process is calculated as one of the indices by a mapping operation of a mapping function using the degree of functional sufficiency and the degree of relationship. The degree of necessity of each provided functional item can be calculated as one of the indices by a mapping operation of a reverse mapping function using the degree of importance of the element item of each functional process and the degree of relationship.

In the step of generating and displaying the evaluation window, an evaluation window showing the suitability of the support to the element item of each functional process of the provided support function to the business process is generated by the difference between the calculated degree of attainment and the degree of importance with respect to the element item of each functional process, and an evaluation window showing the degree of functional excessiveness/deficiency of each provided functional item by the difference between the calculated degree of necessity and the degree of sufficiency with respect to each provided functional item can be generated.

The degree of relationship between the functional process item and the functional item provided by the system configuration candidate can be defined as an association matrix of the functional process items and the functional items provided by the system configuration candidate.

In the step of defining the functional process model, the function element can be set in accordance with an information frame in which conceptual levels of languages are unified by a language configuration of 5W1H.

According to a second embodiment of the invention, there is provided a system configuration proposal tool for supporting an evaluation of effects of a supporting system for enhancing the business processing ability of a human and a system configuration proposal suited to a business process, comprising:

means for defining a functional process model expressing functional items of the business process whose system configuration is to be proposed in a basic function element unit of information processing;

means for receiving and defining a setting of the degree of importance of each of function element items in the functional process;

means for defining a candidate of an information system which is used as a means for carrying out the functional process by receiving designation of the functional items provided by the utilized information system and human information processing functions of human resources and combining the designated functional items;

means for receiving and defining a setting of the degree of functional sufficiency of the provided functional items;

means for receiving a setting for associating the element items of each functional process with the functional items provided by each system configuration candidate and defining the setting of the degree of relationship;

means for executing an operation for obtaining an index for evaluating the degree of functional support suitability of the system configuration candidate by a predetermined function using the degree of relationship between the functional process item and the related functional item provided by the system configuration candidate, the degree of importance of the functional process item, and the degree of functional sufficiency of the provided functional item;

means for generating and displaying an evaluation window in a designated display mode by using the calculated index; and means for determining a system configuration to be proposed from the defined system configuration candidates.

The means for defining the functional process model comprises: a first function means of defining a status process model expressing a status transition of each processing item of the business process from the business process model as a lower layer of the business process model; and a second function means of hierarchically defining in detail the processing items executed in the statuses of the status process model and its transition as a functional process model and as a lower layer of the status process model. By the second function means executing after execution of the first function means, the functional process model is supported so as to be inductively and systematically lead.

The means for determining a system configuration to be proposed from the candidates can determine the system configuration in which preference of the system introducer is reflected by providing means for using the business support suitability, the degree of excessiveness/deficiency of the provided function, and a system introducing cost as criteria for selecting the system configuration and for interactively setting a relative weight of each criterion by the user of the tool.

The means for generating and displaying the evaluation window has the function of visually displaying the degree of functional support suitability by a graph and can identify and display the particulars of the degree of excessiveness/deficiency of the provided function by a bar graph by grouping the results of the business support suitability and the degree of excessiveness/deficiency of the provided function in accordance with the difference between a necessary level and an attainment level. The means for generating and displaying the evaluation window has the function of visually displaying the functional support suitability by a graph and displays the excessiveness/deficiency by a broken line graph expressing the results of the business support suitability of each functional process element item and the degree of excessiveness/deficiency of the provided function of the system providing function item by a necessary level and an attainment level. Further, the means for generating and displaying the evaluation window has the function of visually displaying the functional support suitability by a graph and can display the evaluation result of the support suitability of each of the type and level of information processing and the type of interactive processing by a broken line graph using axes of the types.

According to a third embodiment of the invention, as in the second embodiment, there is provided a system configuration proposal support tool having a database server in which process model/system configuration candidate information as shared sample information in the event of the system configuration proposal is classified into the business process types and is registered, wherein the sample information is used or re-used as a sample by connecting a plurality of system configuration proposal tools to the server via a network.

According to a fourth embodiment of the invention, there is provided a recording medium in which process model/system configuration candidate information which is data used for the foregoing system configuration proposal support tool when the system configuration is proposed in each of the tools is classified into business process types and recorded as shared sample information.

More specifically, the configuration proposal support tool of the invention comprises:

means for inductively breaking down the business process to a basic function element unit of information processing and visually interactively defining each element as a network-structured functional process model in accordance with an information frame in which conceptual levels of languages are unified by a language expression configuration of 5W1H (when, where, who, why, what, how);

means for visually and interactively defining a combination of functional items of an information system used as a means for carrying out each functional process and human information processing functional items of a related worker as a system configuration candidate in accordance with an information frame;

means for visually and interactively defining the degree of importance expressing the degree of importance of the defined each functional process by numerical values and the degree of sufficiency expressing the degree of functional sufficiency of each of functional items provided by the system configuration candidate by numerical values;

means for visually and interactively defining a relationship matrix constructed by association of each of the functional items (means) provided by the system configuration candidate to each of the items (target) of the functional process and the degree of relationship expressing the degree of the relationship by numerical value;

means for executing an evaluation operation for calculating the degree of attainment of each functional process by executing a mapping operation of a mapping function using the relationship matrix to the degree of functional sufficiency of each of the functional items provided by the system configuration candidate and for obtaining the support suitability of the provided support function to the business process by the difference between the degree of attainment and the degree of importance of each functional process; a means for executing an evaluation operation for calculating the degree of necessity of each provided functional process by executing the mapping operation of a reverse mapping function using the relationship matrix to the degree of importance of each functional process and obtaining the excessiveness/deficiency of the provided function by the difference between the degree of necessity and the functional sufficiency of the provided functional item;

means for grouping the functional processes into types of individual work, group communication, group coordination, and group collaboration and mutual action (interactive loop) types of human and information systems to business processes of a human loop, a machine loop, a human-GUI loop, and a human machine loop and totalling and normalizing the support suitability of each functional process on the group unit (process type, information process level, and interactive loop type) basis;

means for visually displaying the results of the evaluation operations for the functional suitability by a graph;

means for determining the system configuration as optimum providing function items to the business process on the basis of the evaluation results of each of the system configuration candidates; and means for visually displaying the result by a graph.

The foregoing and other objects, advantages, manner of operation and novel features of the present invention will be understood from the following detailed description when read in connection with the accompanying drawings.

BRIEF DESCRIPTION OF THE DRAWINGS

FIG. 4 is an explanatory diagram showing an example of a resource library registration window;

FIG. 10 is an explanatory diagram showing an example of a system configuration candidate definition window;

FIG. 11 is an explanatory diagram showing an example of a functional process—system providing function relationship definition window;

FIG. 12 is an explanatory diagram showing an example of a functional process—system providing function interactive loop definition window;

FIG. 24 is an explanatory diagram showing an example of a display window for the result of system configuration proposal;

DETAILED DESCRIPTION OF THE PREFERRED EMBODIMENTS

Embodiments of the invention will be described hereinbelow with reference to the drawings.

As a first embodiment of the invention, the configuration and operation for proposing a new system suitable for a business process will be described.

Figure 1:
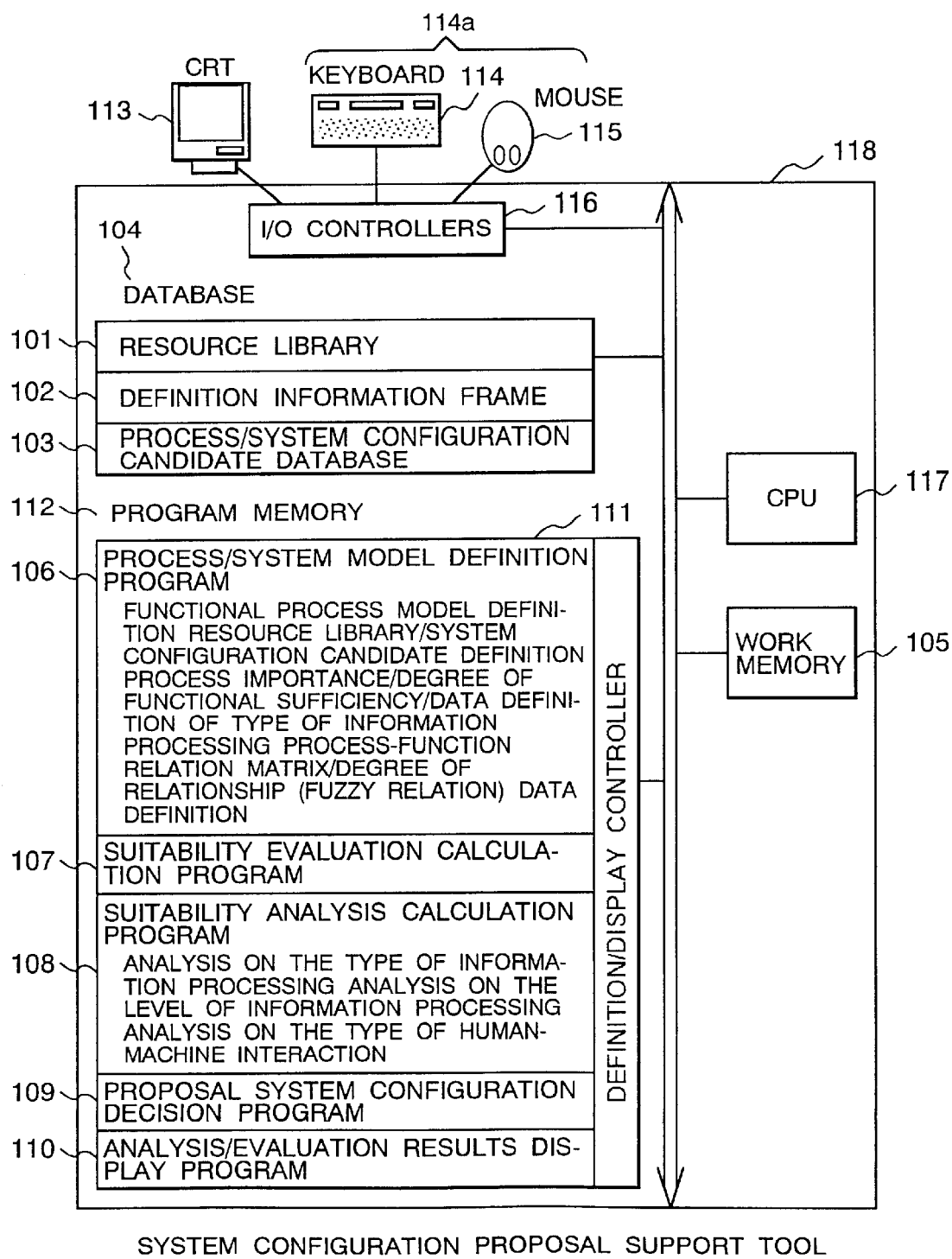
FIG. 1 is a block diagram showing the system configuration of a system configuration proposal support tool used in an embodiment of the invention.

FIG. 1 is a diagram showing the system configuration of a system configuration proposal support tool according to the invention. The system configuration proposal support tool according to the invention comprises the body 118 of an information processing apparatus (hereinbelow, it will be also simply called a tool) for executing a system configuration proposal support process, a display 113 for displaying a definition window, an evaluation result display window, and the like, and an input device 114a for performing an operation such as inputting of various instructions to the tool.

The tool 118 comprises a database 104 for accumulating various data for support, a work memory 105 used for work, a program memory 112 for storing various programs for support, an input/output control unit 116 for controlling inputting/outputting operations to the display 113 and the input device 114a, and a CPU 117 for executing various programs for inputting/outputting operations, processes for accessing the memory and database, supporting processes, and the like.

The database 104 has: a resource library 101 for storing resource information such as tool, components, human resources, and the like as component elements of the proposal system; a definition information frame 102 for defining a business process by the expression of a basic function element of information processing; and a process/system configuration candidate information database 103 for storing process/system configuration candidate information.

The work memory 105 temporarily stores data such as data necessary in association with various processes of the CPU 117. For example, the work memory 105 temporarily stores necessary information retrieved from the database 104 and stores work regions and results used for a process/system model definition program, a suitability analysis/evaluation calculation program, a proposal system decision calculation program, and an evaluation results display program.

The program memory 112 stores the following programs for execution by the CPU 117; a process/system model definition program 106 for supporting resource library definition, functional process model definition, system configuration candidate definition, data definition of the degree of importance of a process and the degree of functional sufficiency, data definition of the type and level of information processing and the type of interactive loop, matrix of process-function relationship, and data definition of the degree of relationship; a suitability evaluation calculation program 107; a suitability analysis calculation program 108 for each type and level of information processing and type of interactive process; a proposal system configuration decision program 109 for determining a proposal system configuration from system candidates by suitability evaluation; an analysis/evaluation results display program 110 for graphically displaying the analysis and evaluation results; and a definition/display controller 111 for controlling the above definition and display processes.

For instance, a CRT is used as the display 113. In the following description, "display 113" is therefore also described as "CRT 113". Obviously, the display is not limited to a CRT. Other displays such as a liquid crystal display and plasma display can be also used.

As the input device 114a, for example, a keyboard 114, a mouse 115, and the like can be used for selecting and setting the model definition and related information. The invention is not obviously limited to the above. Other input devices can be also used with or instead of the above.

An example of the operation when the configuration of a new system is proposed in the system configuration proposal support tool according to the invention will be described with reference to FIGS. 1 to 24.

Figure 2:
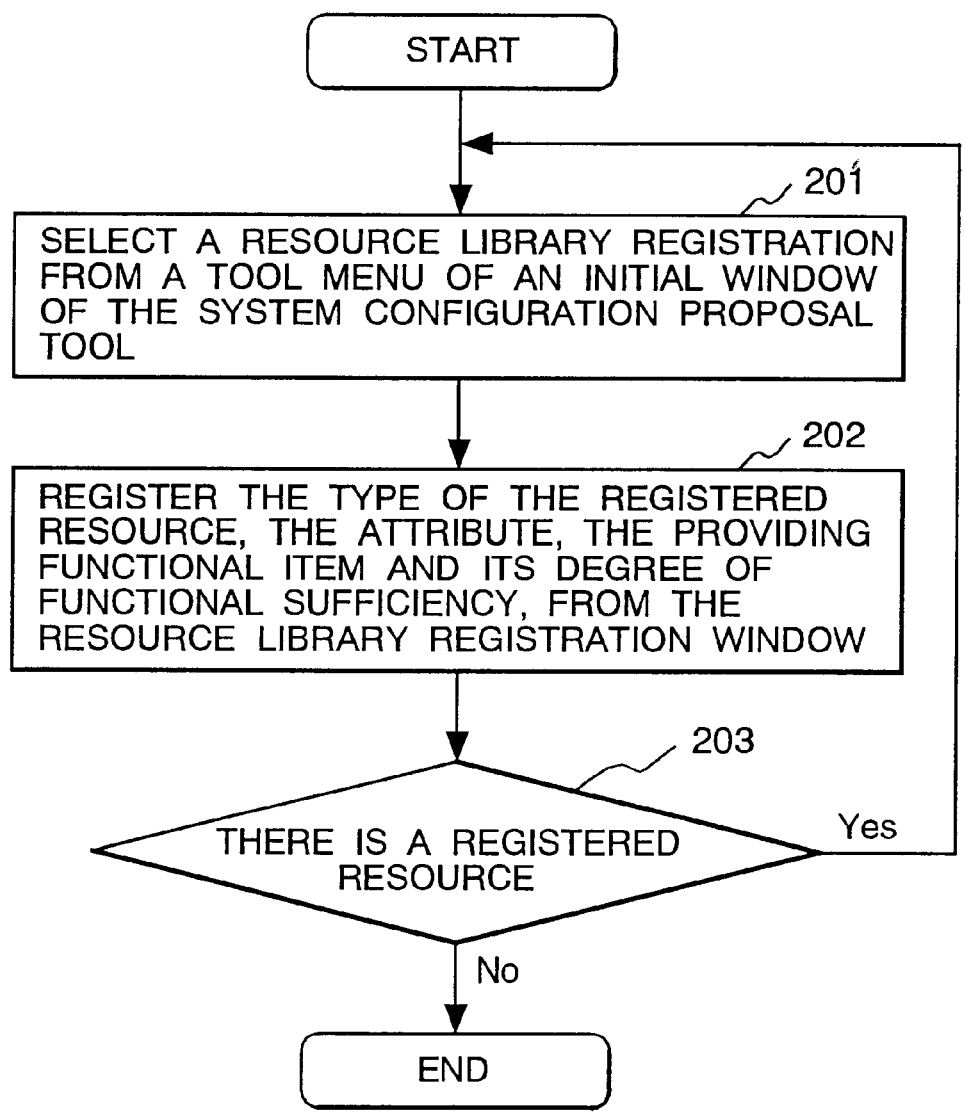
FIG. 2 shows an operation flow of a processing procedure of resource library registration.
Figure 3:
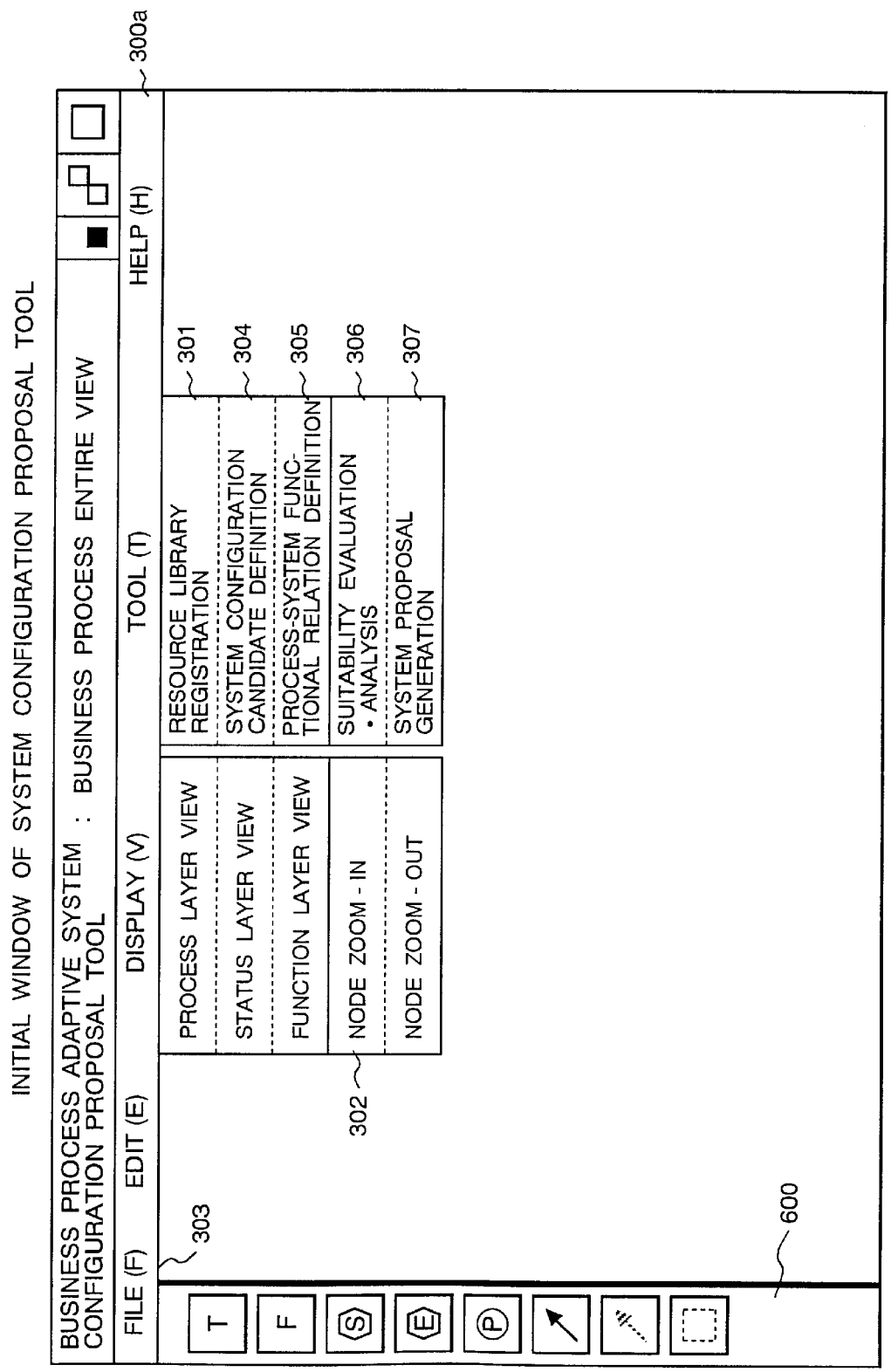
FIG. 3 is an explanatory diagram showing an example of an initial window of a system configuration proposal tool.

FIG. 2 shows an operational flow of a process for preliminarily registering resources as system configuration elements into the resource library 101 by the process/system model definition program 106 in order to evaluate and propose the system configuration using the system configuration proposal support tool of the invention. FIG. 3 shows an example of an initial window of the system configuration proposal tool. FIG. 4 shows an example of a resource library registration window.

The CPU 117 executes a process for receiving selection of the resource library registration by the user (step 201). That is, the initial window of the system configuration proposal support tool is displayed on the CRT 113 shown in FIG. 3. In the upper area of the window, "business process adaptive system configuration proposal tool: business process entire view" is displayed in the horizontal direction. Below it, a tool menu bar 300a for tool menu selection is displayed in the horizontal direction. In the menu bar 300a, file (F), edit (E), display (V), tool (T) and help (H) are displayed. By selecting one of them, the menu is further displayed. The user can give an instruction by using the tool menu in the initial window of the system configuration proposal support tool on the CRT 113 shown by FIG. 3. When an instruction to select tool (T) in the tool menu bar 300a is received, the support tool displays the menu on the window and waits for an instruction input. When an instruction to select resource library registration 301 is input by the mouse 115 or keyboard 114, the instruction is received.

When the instruction to select the resource library registration 301 is received, the CPU 117 displays a resource library registration window shown in FIG. 4 on the CRT 113. Displayed in the registration window shown in FIG. 4 are the designation "resource library registration", displayed in the horizontal direction in the upper area of the window, OK button 4091 for confirmation and consent, cancel button 4092 for cancellation of the instruction, and help button 4093 for requesting help. Also displayed are resource types 401, including information system resource 4011, human resource 4012, and other resources 4013, for selecting the type of resource, resource attribute 402, including large classification 4021, detailed classification 4022, name 4023, model name 4024, supplier 4025, and price 4026, for setting the attribute of the resource, and a list of provided functional items 403a, including functional item selection 403, functional items 404, selection of the degree of sufficiency 405, functional sufficiency degree 406, "add" button 407, and "delete button 408, for showing the functional items provided by the registered resources in a list.

Each of the buttons, such as OK button 4091, is displayed in a figure illustrating the shape of a button as an area for receiving an instruction. On the surface of the figure, character, code, figure, and the like indicative of the contents of the instruction to be received are displayed. The buttons are displayed similarly also in other windows. The operation to the buttons is performed by positioning the cursor on the figure of the button and clicking the mouse. Consequently, if the button is pushed, the instruction is inputted. In the specification, therefore, the expression the "button is pushed" is used.

Either the information system resource 4011, human resource 4012, and other resources 4013 in the resource types 401 to be registered is selected by the mouse 115 or keyboard 114. Similarly, selections regarding the large classification 4021, detailed classification 4022, name 4023, model name 4024, supplier 4025, and price 4026 in the resource attribute 402 are received and registered.

The functional item 404 provided by the registered resource in the list 403a of functional items is selected by pushing the add button 407 (delete button 408 in case of deletion) by using the mouse 115 or by receiving an input from the keyboard 114 and the selected functional item 404 is set. An instruction to select the degree 406 of functional sufficiency of each functional item is received by the pushing of the add button 407 by the mouse 115 and the degree of sufficiency is set in the degree of functional sufficiency 406 (step 202). In such a state, an instruction is waited. After confirming the registered information, the user can instruct the registration of the set information by pushing the OK button 4091. The CPU 117 then registers the set item in response thereto.

The operation is executed for each of the registration resources. When all of the resources are registered, the operation is finished. The CPU 117 checks if there is still an unregistered resource. If all of the resources are registered, the resource library registering process is finished (step 203).

The processing operation when the configuration of a new system is proposed by using the system shown in FIG. 1 will be described by an example of a help desk business.

Figure 5:
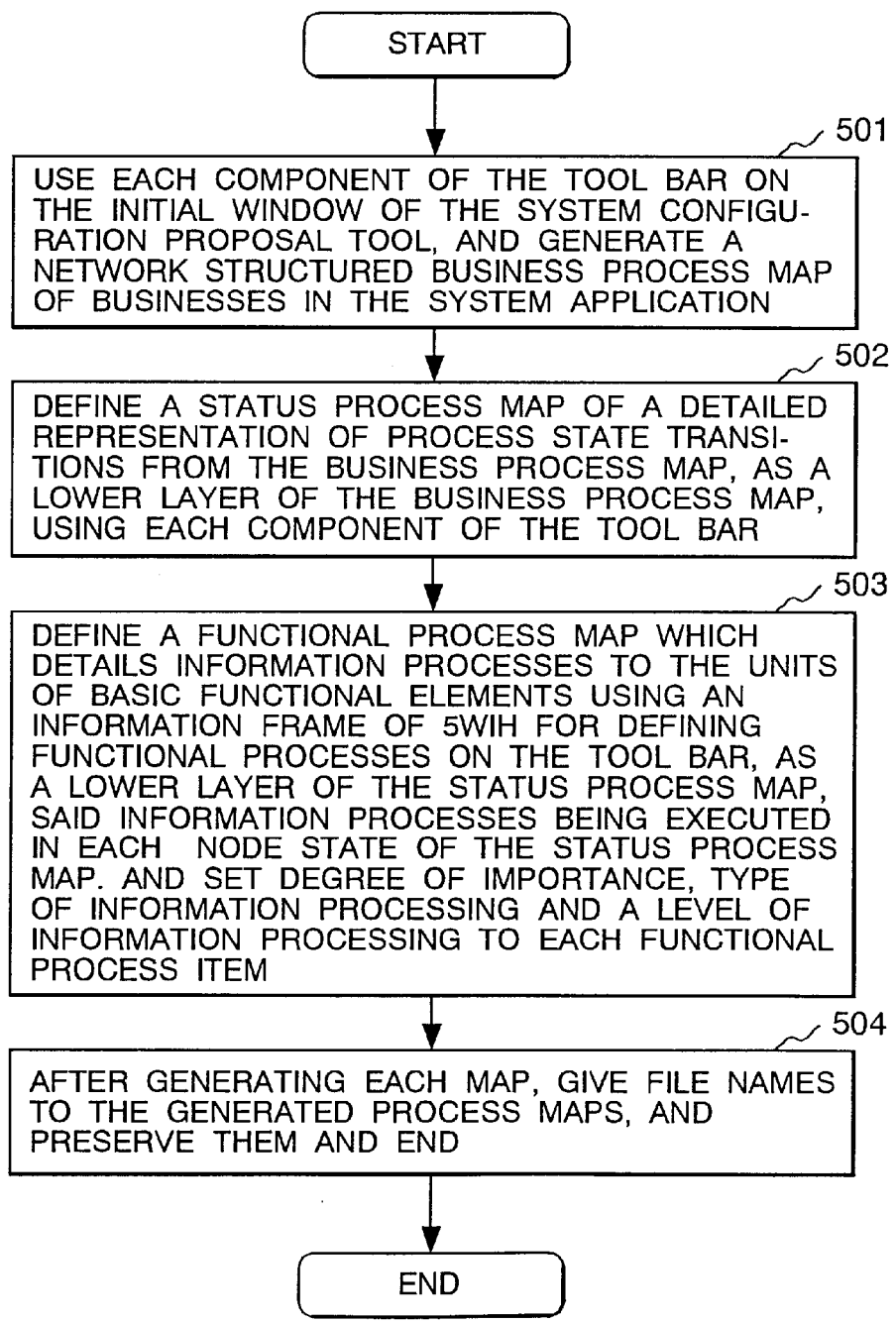
FIG. 5 shows an operation flow of a business functional process definition.
Figure 6:
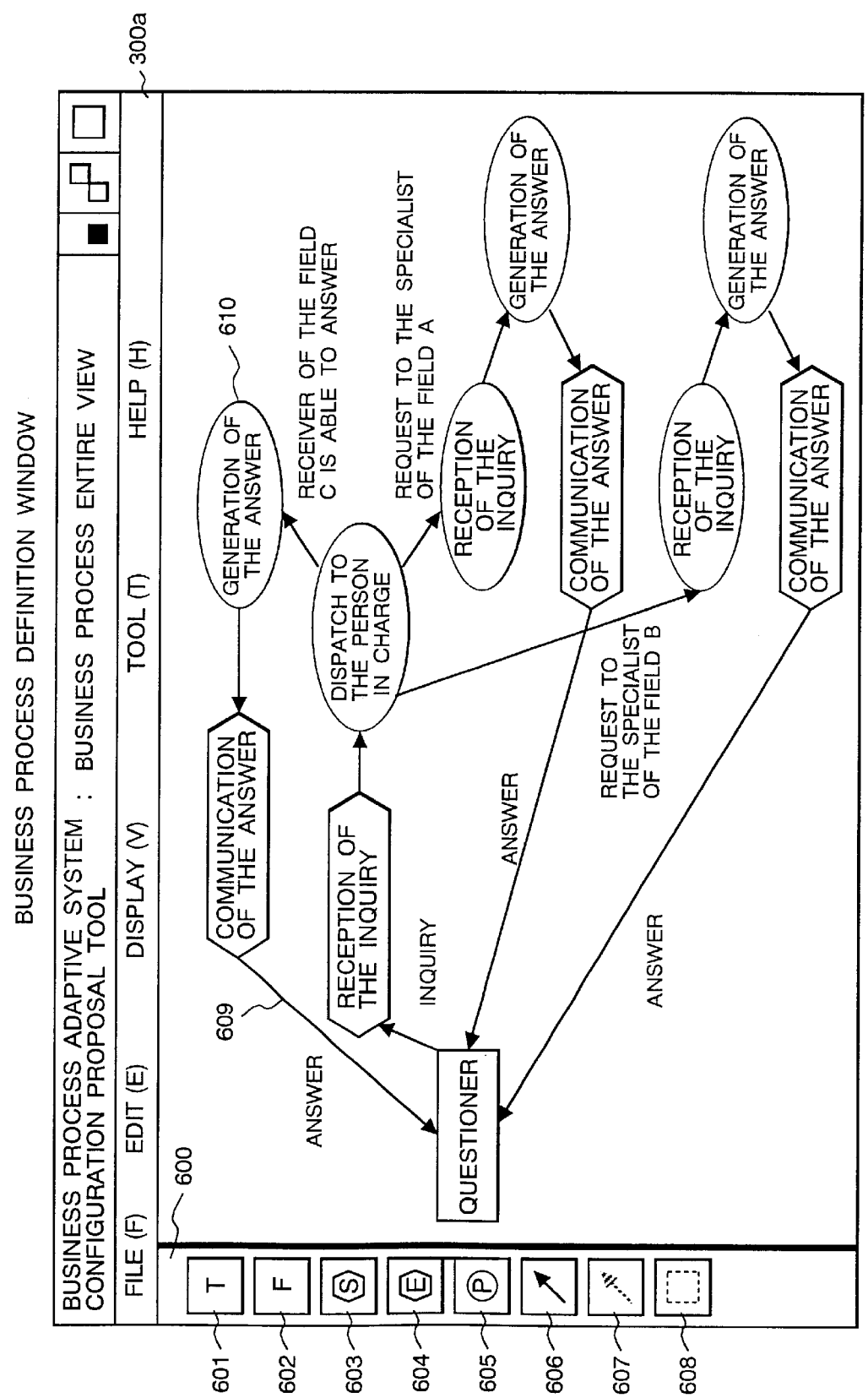
FIG. 6 is an explanatory diagram showing an example of a business process definition window.

First, the functional process model of a help desk business as an application target is defined by the process/system model definition program 106. FIG. 5 shows the operation flow for defining the functional process model. FIG. 6 shows an example of a business process definition window.

The CPU 117 receives the selection of the tool and supports generation of a business process map by the selected tool (step 501). That is, the initial window of business process definition is displayed on the CRT 113 shown in FIG. 6. In the upper area of the window, "business process adaptive system configuration proposal tool: business process entire view" is displayed in the horizontal direction. Below that, the tool menu bar 300a for tool menu selection is displayed in the horizontal direction in a manner similar to the window of FIG. 3. Since the menu bar 300a has been already described above, a description thereof has been omitted. In the window of FIG. 6, a tool bar 600 is displayed vertically on the left side.

In the tool bar 600, selection instruction buttons of text input 601, 5W1H information system frame dialog 602 for functional process definition, start process definition 603, end process definition 604, general process definition 605, inside-process link definition 606, outside-process link definition 607, and outside process information definition 608 are displayed. Inside each button, a sign indicative of the function of each tool is reduced and shown. By referring to the displayed figures and selecting a necessary tool, the user can use the selected tool. When the user selects a button, for instance, if the button is one of the buttons 602 to 608, the sign can be dragged into the business process entire view window. For example, by changing the display sign of the selected button, the user can be informed of the selection. In case of the button 601, a text can be inputted into the window. The button 602 will be described herein later.

The CPU 117 then executes the process as follows. The CPU 117 receives the selection of the text input 601, start process definition 603, end process definition 604, general process definition 605, inside-process link definition 606, outside process link definition 607, or outside process information definition 608 from the tool bar 600 on the left side of the initial window of the system configuration proposal tool on the CRT 113 as shown by FIG. 6 using the mouse 115 or the like. The CPU 117 arranges the figure showing the sign of the received tool and receives an adjustment of the size. By the selection of the button 601, the CPU 117 receives a text inputted from the keyboard 114 and displays the text in a necessary part. In this manner, the generation of the network structured business process map 609 is supported (step 501).

Figure 7:
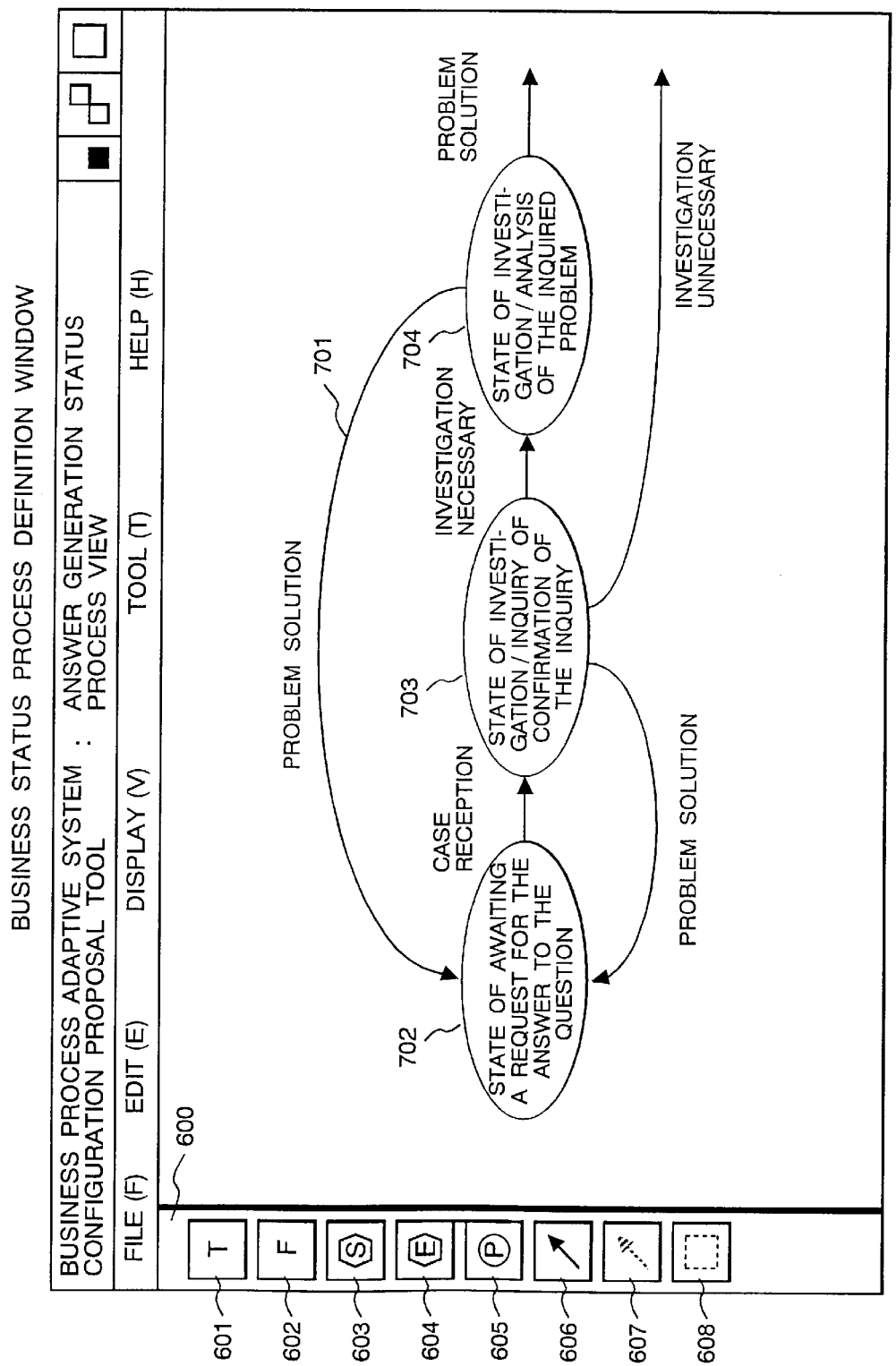
FIG. 7 is an explanatory diagram showing an example of a business status process definition window.

The business process map 609 in FIG. 6 is a modelled example of the help desk business such that an inquiry is received from a questioner, the inquiry is transferred (dispatched) to specialists in the field (including the person in charge who received the inquiry) in accordance with the field of the inquiry, and the specialists generate and send their answers to the questioner simultaneously (concurrently). After the generation of the business process map, the CPU 117 supports to define a status process map of a detailed representation of process state transitions from the business process map, as a lower layer of the business process map (step 502). In this case, object designation by the mouse 115 with respect to a process node of the business process map 609, for example, an "answer generation" node 610 is received. By receiving selection of node zoom-in 302 in the display menu (V) in the menu bar 300a (refer to FIG. 3), the window is transitioned to a status process layer view as shown in FIG. 7. In a manner similar to the above-mentioned generation of the business process map, selection of a definition component from the tool bar 600 is received, the selected definition component is arranged in the window, and an answer generation status transition diagram in the "answer generation" node 610 is formed as A network-structured model, thereby realizing the support.

The answer generation status process view shown in FIG. 7 has a configuration similar to that of the window shown in each of FIGS. 3 and 6. The example shown in FIG. 7 is a model in which "problem solution" 701 is transitioned from "state of awaiting a request for the answer to the question" 702 to "state of investigation/inquiry of confirmation of the inquiry" 703 after reception of the case. When investigation is necessary, the state is transitioned to "state of investigation/analysis of the inquired problem" 704.

After generation of the status process map, the CPU 117 supports a process for defining the functional process map which details information processes to the units of basic functional elements, as a lower layer of the status process map. The information processes are executed in each node state of the status process map (step 503). This is realized by performing support of transitioning the window to the functional process layer view, selecting a definition component from the tool bar 600, and arranging the selected definition component by an operation similar to that for defining the status process.

Figure 8:
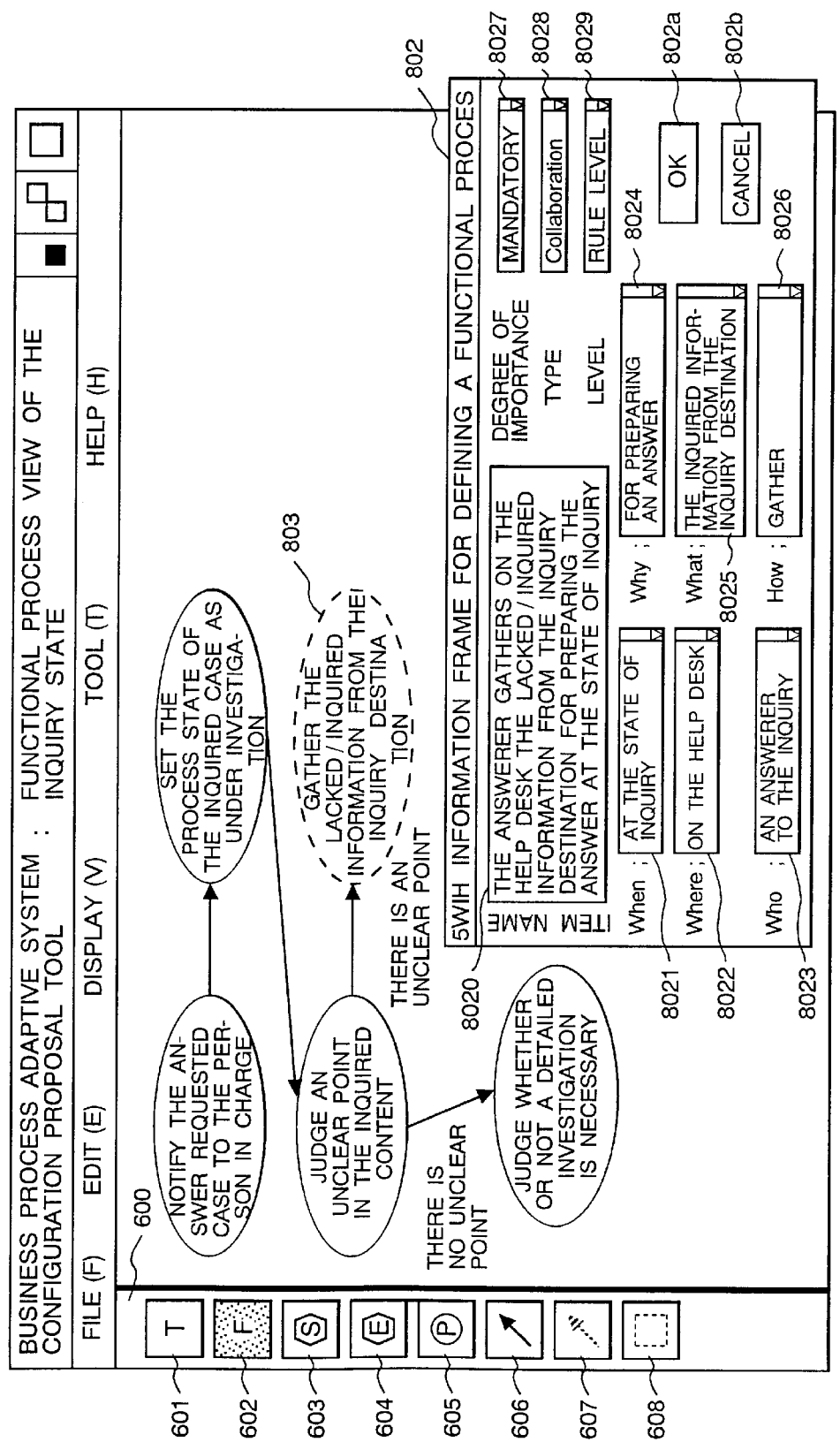
FIG. 8 is an explanatory diagram showing an example of a functional process definition window.

FIG. 8 shows a generation example of the functional process map of the "state of investigation/inquiry of confirmation of the inquiry" 703. The functional process item as a node of the functional process is defined in such a manner that the CPU 117 receives the selection of the information frame utilization input 602 in the tool bar 600 refers to the definition information frame 102 in the database 104, and opens 5W1H information frame dialog box 802 for defining a functional process.

In the dialog box 802, as 5W1H information, setting of the items of "when" 8021, "where" 8022, "who" 8023, "why" 8024, "what" 8025, and "how" 8026 is received. For example, in "when" 8021, the state, time, case, and the like such as a time of an upper status process node are set. In "where" 8022, a place in the business environment is designated. For example, "at a questioner, "at a vendor", "in a help desk room", or the like is received. In "who" 8023, an executor of the functional process such as a questioner, a receiver of an inquiry, an answerer to the inquiry, or the like is received. In "why" 8024, the purpose such as, expression of the upper business process node is received. In "what" 8025, as an object of the information processing, designation of a business state/event, a business resource, or an operation in business, for instance, designation of the presence/absence of an answer requiring case, lacked/inquired information, a real machine test, or the like is received. In "how" 8026, designation of a basic functional element of information processing is received. For example, designation of an element such as get, set, action, event report, create, delete, or the like as a basic element for communication is received. Designation of conversion, analysis, synthesis, evaluation, decision, planning, or the like as a functional element to use information is also received in this case, selection of one of the elements is accepted.

The setting of the setting items is received by a selecting operation of the mouse 115 or inputting operation of the keyboard 114. In order to unify the expressions regarding the setting of the same content, when already defined information is presented and the same content exists, the information can be selected. In this manner, the support for processing the functional process item name definition is realized.

In the dialog box 802, setting of the degree of importance 8027, type 8028, and level 8029 is also received. In the degree of importance 8027, the degree of importance is selected by the mouse 115 from mandatory (1.0), rather necessary (0.75), may be necessary (0.5), may be unnecessary (0.25), and unnecessary (0.0) in accordance with the character such as indispensable, substitutable, complementary, and supportive of the functional process item. The information process type is selected by the mouse 115 or the like from collaboration, coordination & communication, and personal production. Further, the information processing level is selected by the mouse 115 from skill level, rule level, and knowledge level. In this manner, the setting of each item is supported.

For example, the formal expression according to the information frame of "gather the lacked/inquired information from the inquiry destination" 803 is set as follows; when="at the time of an inquiry state", where="in the help desk room", who="an answerer to the inquiry", why="to generate an answer", what="the inquiry information from the inquiry destination", and how="gather". The degree of importance is 1.0 since it is the indispensable process. The information process type is "collaboration" since the process is a team work of the questioner and the answerer. The information processing level is "rule level" since it is a procedure process.

By the above operation, the functional process model is defined. After the definition, a file name is set and the data is stored into the process/system., configuration candidate database 103, thereby finishing the process (step 504).

The relationship between the new system configuration candidate applied to the business and the functional process of each candidate will be defined by the process/system model definition program 106.

Figure 9:
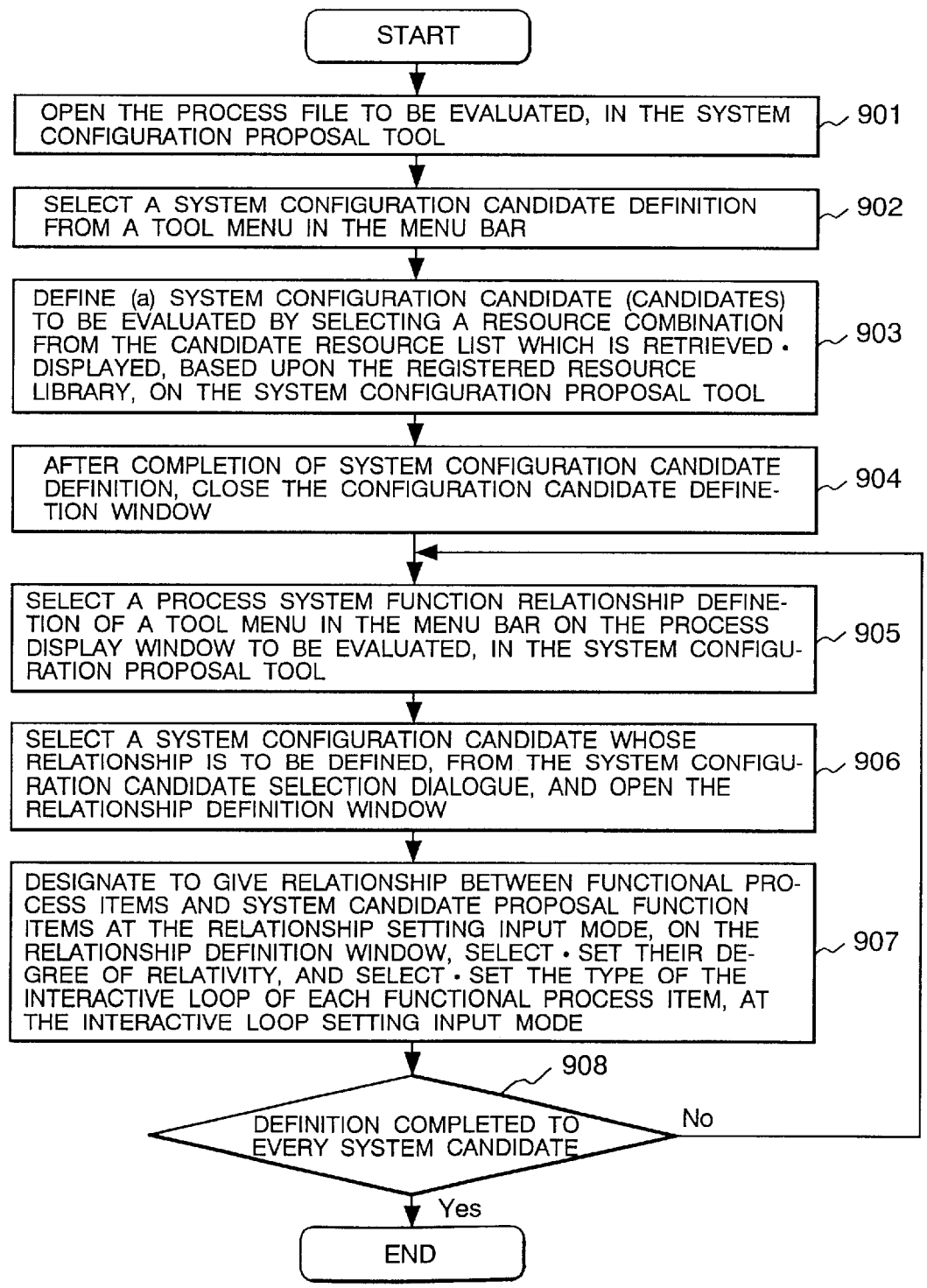
FIG. 9 is a diagram showing an operation flow for definition of the system configuration candidate and for giving relationship to processes.

FIG. 9 shows an operation flow for defining the system configuration candidate and for giving the relationship to the processes. The CPU 117 displays an initial window for defining the system configuration candidate and for giving the relationship to the process on the CRT 113 of the system configuration proposal tool (refer to FIG. 3).

The CPU 117 receives the instruction to the file 303 in the menu bar 300a on the displayed initial window and opens the business process file to be evaluated by retrieving it from the process/system configuration candidate database 103 (step 901). The selection of the system configuration candidate definition 304 is received from the tool menu in the menu bar on the entire view of the business process to be evaluated, which is displayed by opening the file (step 902). Consequently, a system configuration candidate definition window as shown in FIG. 10 is displayed.

The process for defining (a) system configuration candidate (candidates) to he evaluated on the displayed system configuration candidate definition window as shown in FIG. 10 is supported (step 903). First, an input of the system configuration candidate name is received from the keyboard 114. The received system configuration candidate name is displayed on a candidate name display 1010 and is added to a registration candidate list 1020.

When the depression of add/alter button 1001a is detected, the CPU 117 displays a resource addition/alteration dialog box 1002. In the dialog box 1002, retrieval conditions 1003 for setting the conditions for retrieval are displayed. When the retrieval conditions 1003 are received and the retrieval conditions are set, a relevant candidate resource list 1004 from the registration resource library 101 is displayed together with functional items provided by the resource and functional sufficiency information 1005. The user can select the resource as a system configuration element with reference to the functional items provided by the resource and the functional sufficiency information 1005. The CPU 117 detects the depression of the add button 1006a by the mouse 115 and adds the selected resource to the selected resource list 107. By repeating the operation to select a combination of necessary resources, the definition of the system configuration candidate is realized. After completion of the system configuration candidate definition, when the OK button 1008 on the definition window is depressed by the mouse 115, the definition information is registered in the process/system configuration candidate database 103 and the configuration candidate definition is finished (step 904).

The CPU 117 again displays the initial window of the system configuration proposal tool shown in FIG. 3 on the CRT 113. When the process-system functional relationship definition 305 in the tool menu is selected by the mouse 115 on the initial window, the CPU 117 receives the selection and displays a system configuration candidate selection dialog box (not shown) (step 905). The selection of a system configuration candidate whose relationship is to he defined is received via the mouse 115 in the system configuration candidate selection dialog box. By the operation, a relationship definition window as shown in FIG. 11 is opened (step 906). In the relationship definition window shown in FIG. 11, a relationship matrix 1101 of the functional process items and functional items provided by the selected system configuration candidate, a relationship setting mode inputting part 1100, a set button 1105a and a delete button 1105b are displayed in a frame similar to the window shown in FIG. 4. Normally, the relationship setting mode 1100 is displayed as a relationship setting input mode 1102. In the relationship setting input mode 1102, an association 1103 for providing the relationship between the functional process item and the functional item provided by the system candidate and the degree of relationship 1104 for setting the degree of relationship are displayed.

The association 1103 between the functional process item and the functional item provided by the system candidate is inputted with the mouse 115. The degree of relationship 1104 is also received. The degree of relationship is selected by the mouse 115 from "corresponds" (1.0), "tightly related" (0.75), "related" (0.5), "a little related" (0.25), and "not related" (0.0). When a depression of the set button 1105a by the mouse 115 is detected, the CPU 117 sets the selected degree of relationship in the relevant row and column 1106 on the matrix.

Figure 13:
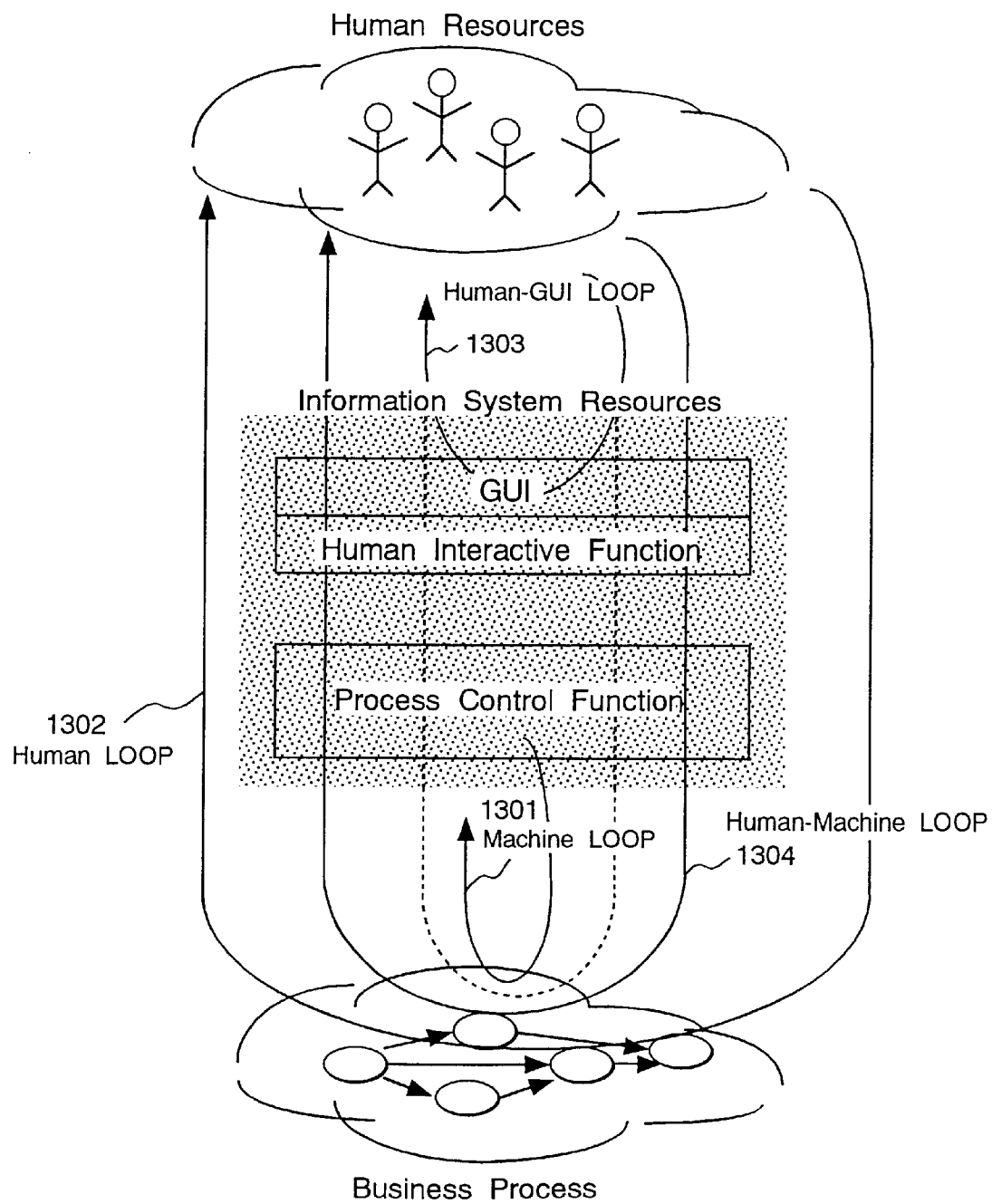
FIG. 13 is an explanatory diagram showing types of interaction loops between business processes and resources.

The input mode can be switched to an interactive loop input mode 1201 as shown in FIG. 12. In the mode 1201, a relationship display 1202 of the functional item provided by the system resource relating to each functional process item and an interactive loop type 1203 of each functional process item are shown. In the relationship display 1202 of the system providing functional item relating to each functional process item, selection regarding the set item is received and the relationship is displayed. With reference to the relationship display, for the type of the interactive loop of each functional process item, the user selects one of machine loop 1301 human loop 1302, human graphical user interface (human-GUI) loop 1303, and human-machine loop 1304 by the mouse 115 in accordance with the mode of the mutual action between the process and the resources is shown in FIG. 13 and depresses the set button 1105a with the mouse 115. The CPU 117 receives the selection and sets the selected loop in the relevant column 1204 in the relationship matrix (step 907). The machine loop 1301 is a loop relating to a process automatically achieved by an information resource or the like. The human loop 1302 is a loop relating to a process achieved only by the human ability. The human-graphical user interface (GUI) loop 1303 is a loop relating to a process achieved between human and information resource GUI. The human-machine loop 1304 is a loop relating to a process achieved by a human using the information resource function. The relationship definition is repeatedly executed with respect to all of the system configuration candidates registered by the foregoing definition of the system configuration candidate. When the relationship definition is executed for all of the candidates, the operation is finished (step 908). The definition information is stored in the process/system configuration candidate database 103.

Figure 14:
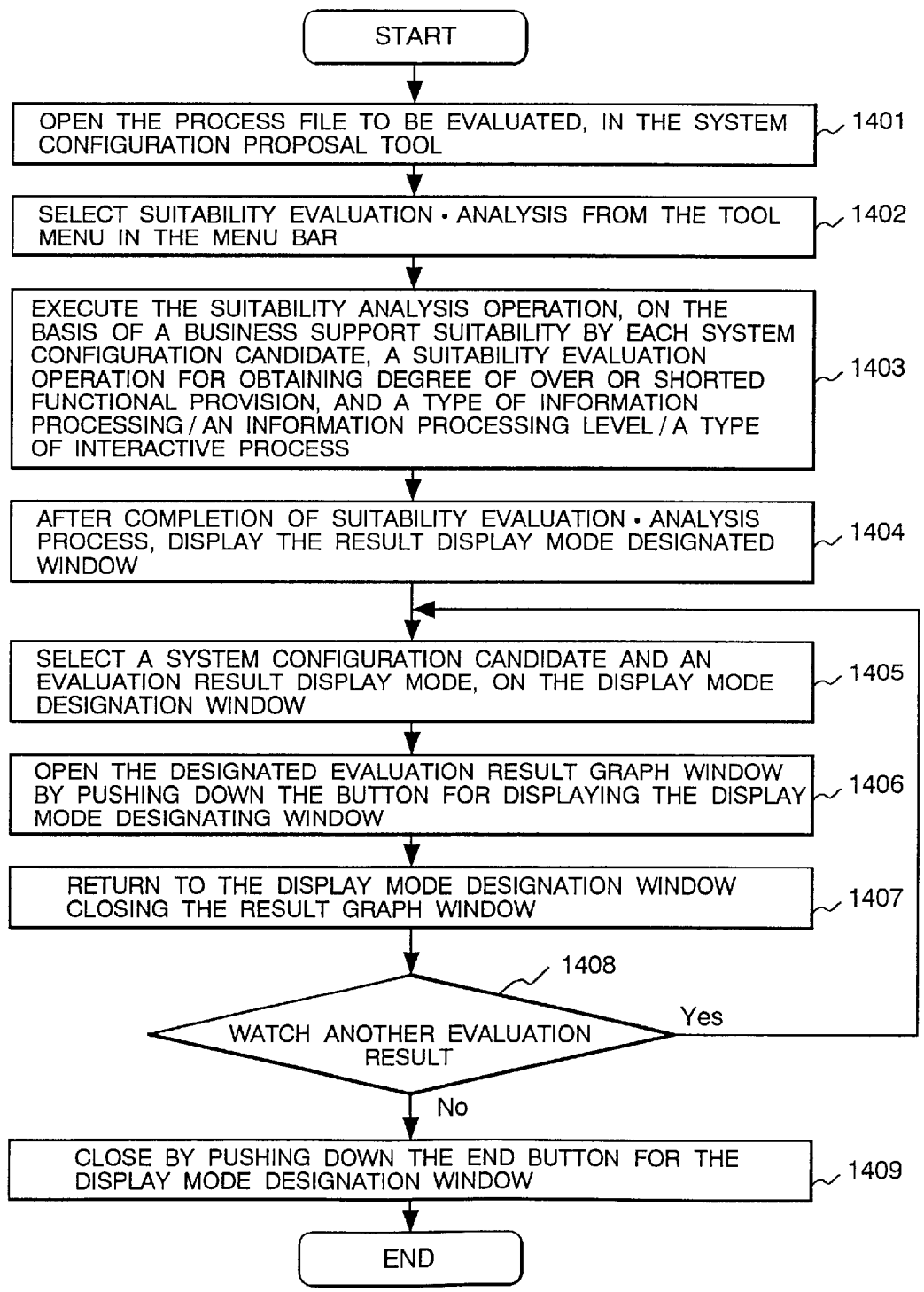
FIG. 14 shows an operational flow of functional suitability evaluation and analysis.
Figure 15:
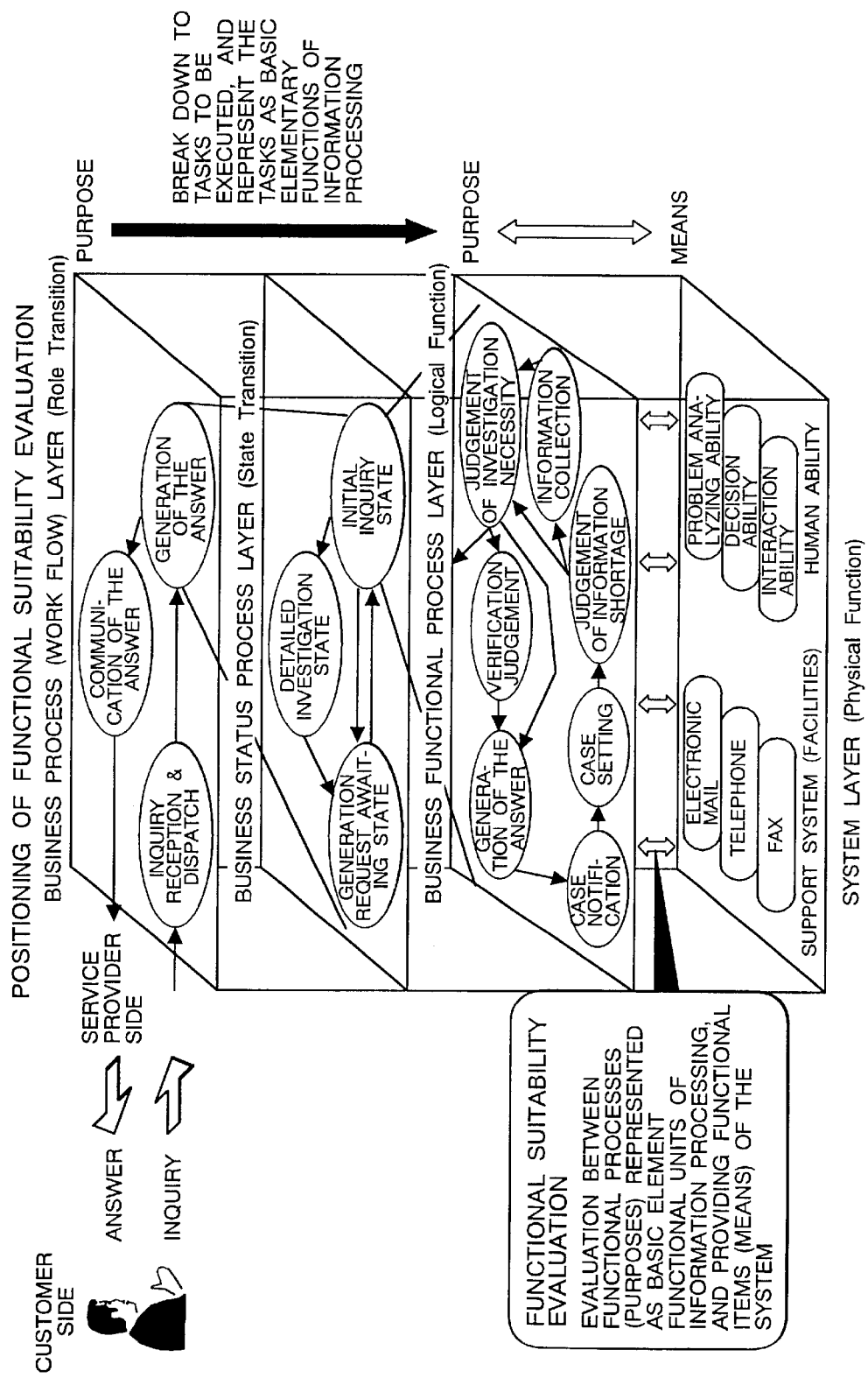
FIG. 15 is an explanatory diagram showing positioning of functional suitability evaluation.

The functional suitability of each new system configuration candidate to the business process is evaluated and analyzed by the suitability evaluation calculation program 107, the suitability analysis calculation program 108, and the analysis/evaluation results display program 110. FIG. 14 shows an operation flow of the functional suitability evaluation and analysis. In the functional suitability evaluation, as shown in FIG. 15, the functional process item represented as a basic functional element of information processing is a purpose, the functional items provided by the system configuration candidate are positioned as means for achieving the purpose, and the suitability between the purpose and the means is evaluated.

The CPU 117 displays the initial window of the system configuration proposal tool, receives the instruction to the file 303 in the menu bar 300a, and opens a process file to be evaluated (step 1401). The CPU 117 receives selection regarding the suitability evaluation and analysis from the tool menu in the menu bar via the mouse 115 (step 1402) in response to the selection, the suitability evaluation calculation program 107 and the suitability analysis calculation program 108 execute the suitability evaluation operation for obtaining the business support suitability and the degree of excessiveness/deficiency of the provided function of each system configuration candidate and the suitability analysis operation by the type and level of information processing and the type of interactive processing of the functional process item (step 1403).

Figure 16:
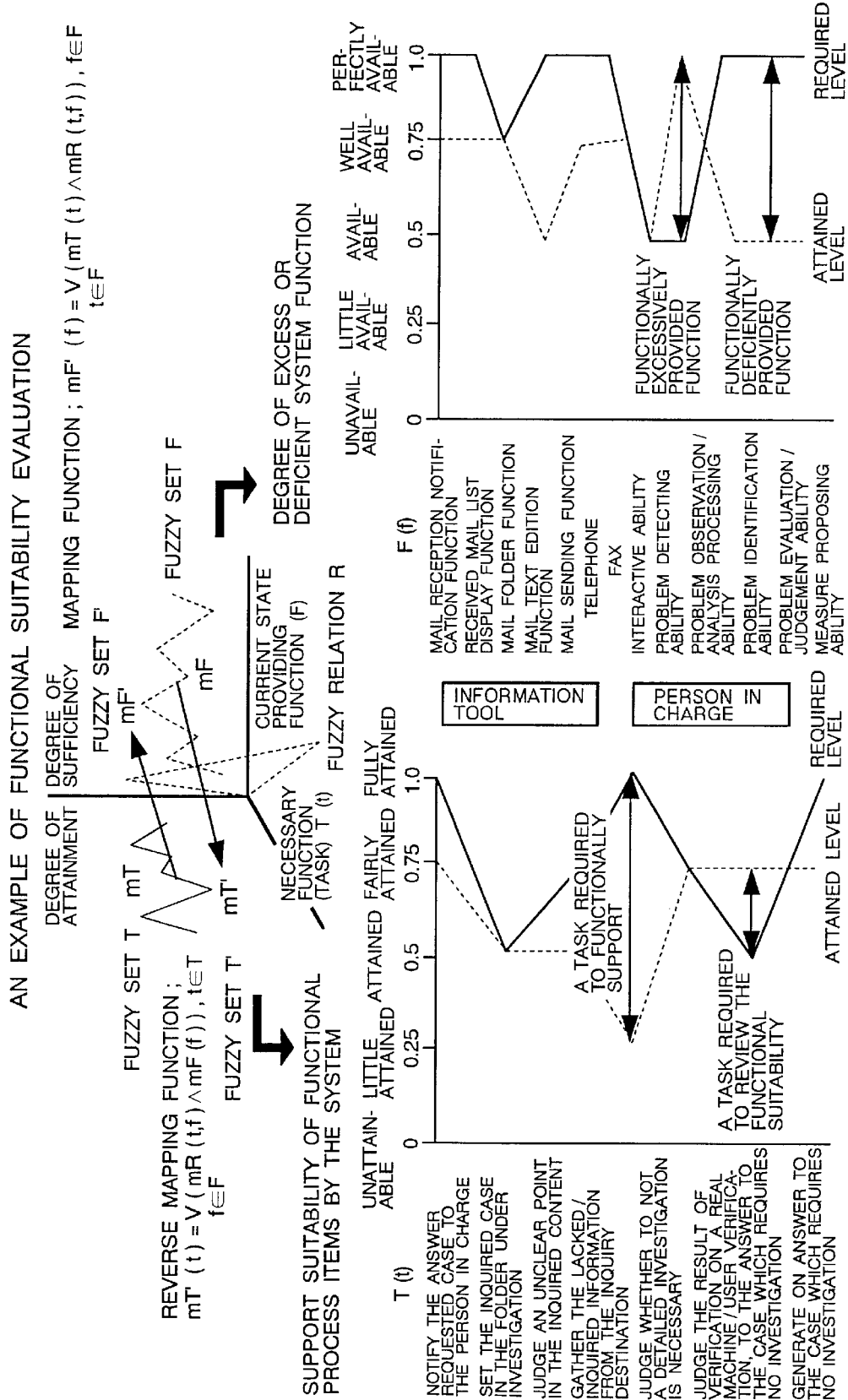
FIG. 16 is an explanatory diagram showing an example of functional suitability evaluation.

In the suitability evaluation calculation, as shown in FIG. 16, the degree mT'(t) of attainment of business support by the provided functional item is calculated by the following mapping function equation in which the degree of relationship is a fuzzy relationship, by the degree mR(t, f) of relationship of the provided function item f relating to the functional process item t which has been defined before, the degree mT(t) of importance of the functional process item and the degree mF(f) of sufficiency of the provided functional item.

$$mT'(t) = \bigvee_{f \in F}(mR(t, f) \wedge mF(f)), t \in f \qquad \text{[Equation 1]}$$

By executing the mapping calculation to the degree of importance of the functional process item by the following reverse mapping function equation, the degree mF'(f) of necessity of the provided functional item is calculated.

$$mF'(f) = \bigvee_{t \in T}(mT(t) \wedge mR(t, f)), f \in F \qquad \text{[Equation 2]}$$

Since mT(t) which has been defined before becomes at a required level and mT'(t) as the calculation result reaches a level which can be attained by the provided function, the degree of business functional suitability is evaluated by the difference. Similarly, by the difference between mF(f) which has been defined before and mF'(f) as the calculation result, the degree of excessiveness/deficiency of the system providing function is evaluated on the other hand, in the suitability analysis calculation, the functional process items are grouped into the information processing types, the information processing levels, and the interactive process types. The business support suitability AF'(%) on a group unit basis is calculated by the following equation with respect to the functional process item (r) in the group.

$$AF' = \sum_{t=1}^{r} \min(mT'(t), mT(t)) \times 100 \Big/ \sum_{t=1}^{r} mT(t) \qquad \text{[Equation 3]}$$

Figure 17:
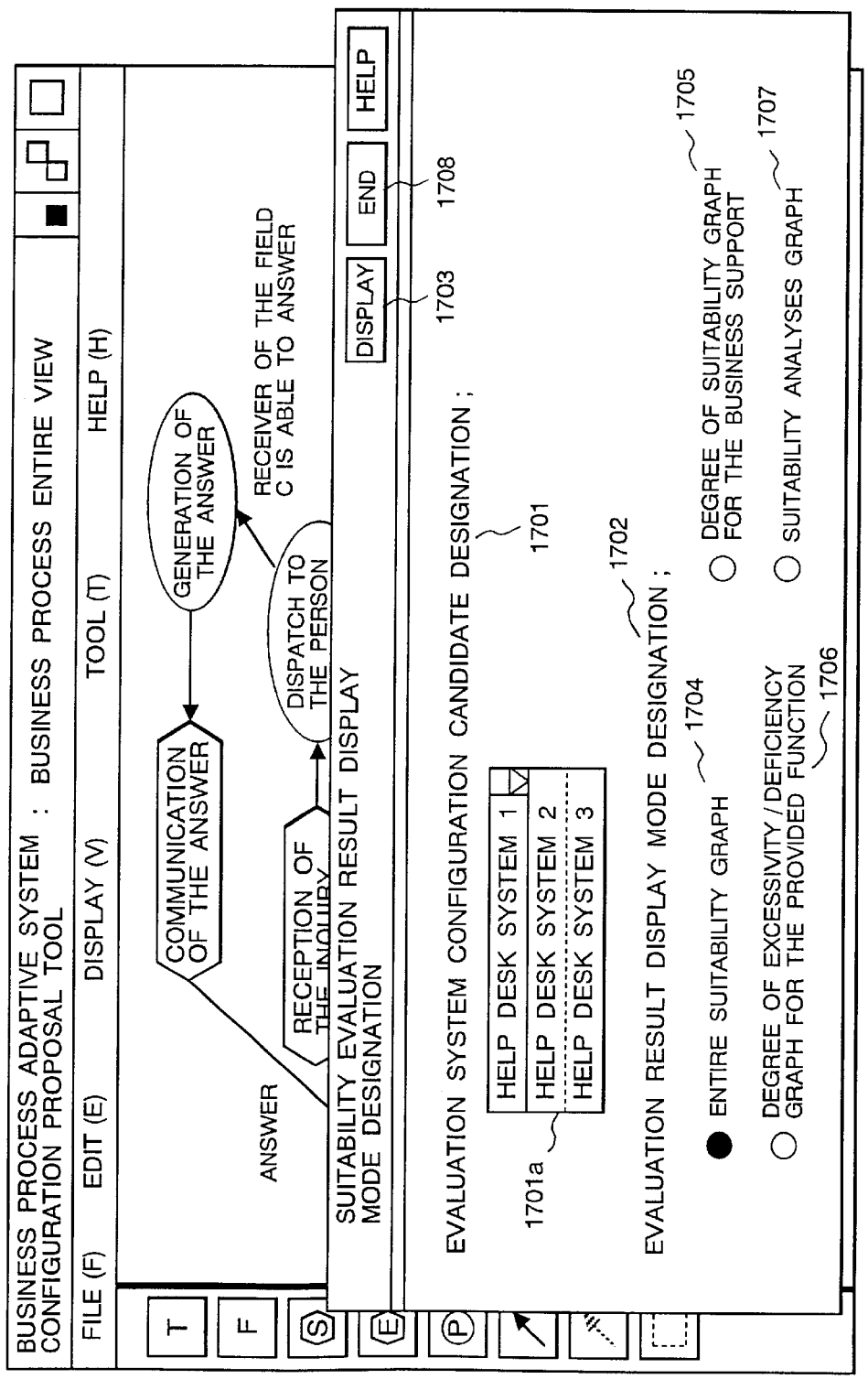
FIG. 17 is an explanatory diagram showing an example of a suitability evaluation result display mode designation window.

After completion of the suitability evaluation/analysis process, the CPU 117 displays the result display mode designation window as shown in FIG. 17 (step 1404) on the result display mode designation window shown in FIG. 17, an evaluation system configuration candidate designation 1701 and result display mode designation 1702 are displayed. Operation buttons such as display 1703, end 1708, and the like are also displayed. In the evaluation system configuration candidate designation 1701, a region 1701a for designating an evaluation system configuration candidate is displayed. In this case, preregistered candidates are displayed and one of them is selected and designated as a candidate. In the result display mode designation 1702, the entire suitability graph 1704, the degree of suitability graph for the business support 1705, of the degree of excessiveness/deficiency graph for the provided function 1706, and the suitability analysis graph 1707 are displayed as options.

In this state, the CPU 117 receives the designation 1701 of the evaluation system configuration candidate and designation regarding the result display mode 1702 (step 1405). When an instruction caused by the depression of the display button 1703 by the mouse 115 is received, the CPU 117 displays the result graph of the designated candidate in the designated mode by the analysis/evaluation result display program 110 (step 1406).

Figure 18:
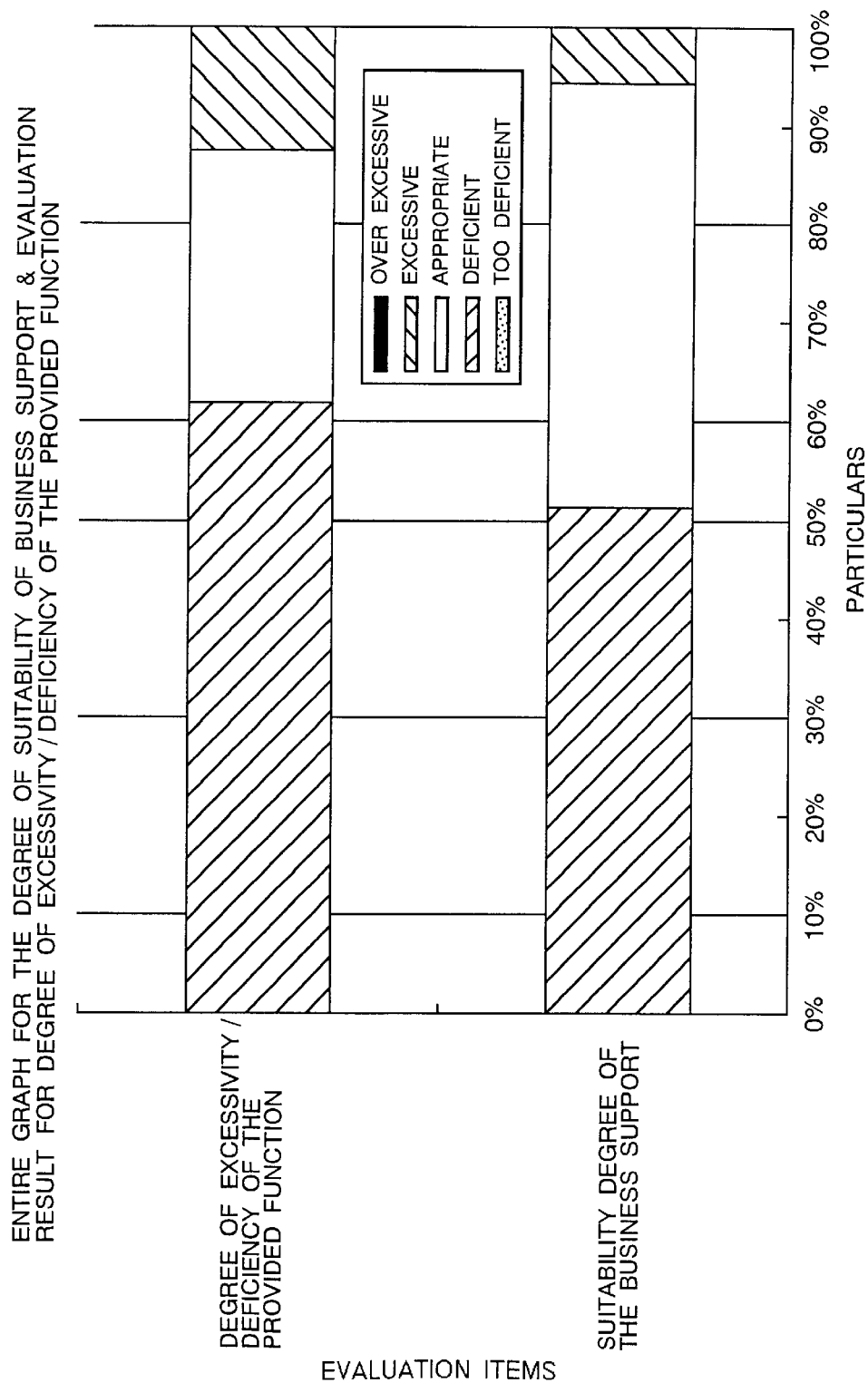
FIG. 18 is an explanatory diagram showing an example of an entire graph for the degree of suitability of business support and evaluation result for a degree of excessiveness/deficiency of the provided function.

When the option of the entire suitability graph 1704 is instructed in the display mode designation 1702, as shown in FIG. 18, the particulars are displayed by the difference between the degree of necessity and the degree of attainment of the business support suitability degree and the degree of excessiveness/deficiency of the provided function. The differences can be classified into "over excessive; +0.75 or higher", "excessive; +0.25 to 0.5", "appropriate; 0", "deficient; −0.25 to 0.5", and "too deficient; −0.75 or lower". In the example of FIG. 18, in the selected system configuration candidate, although there are no "over excessive" and "too deficient", it is understood that the provided function is deficient as a whole and the support to the business is deficient.

Figure 19:
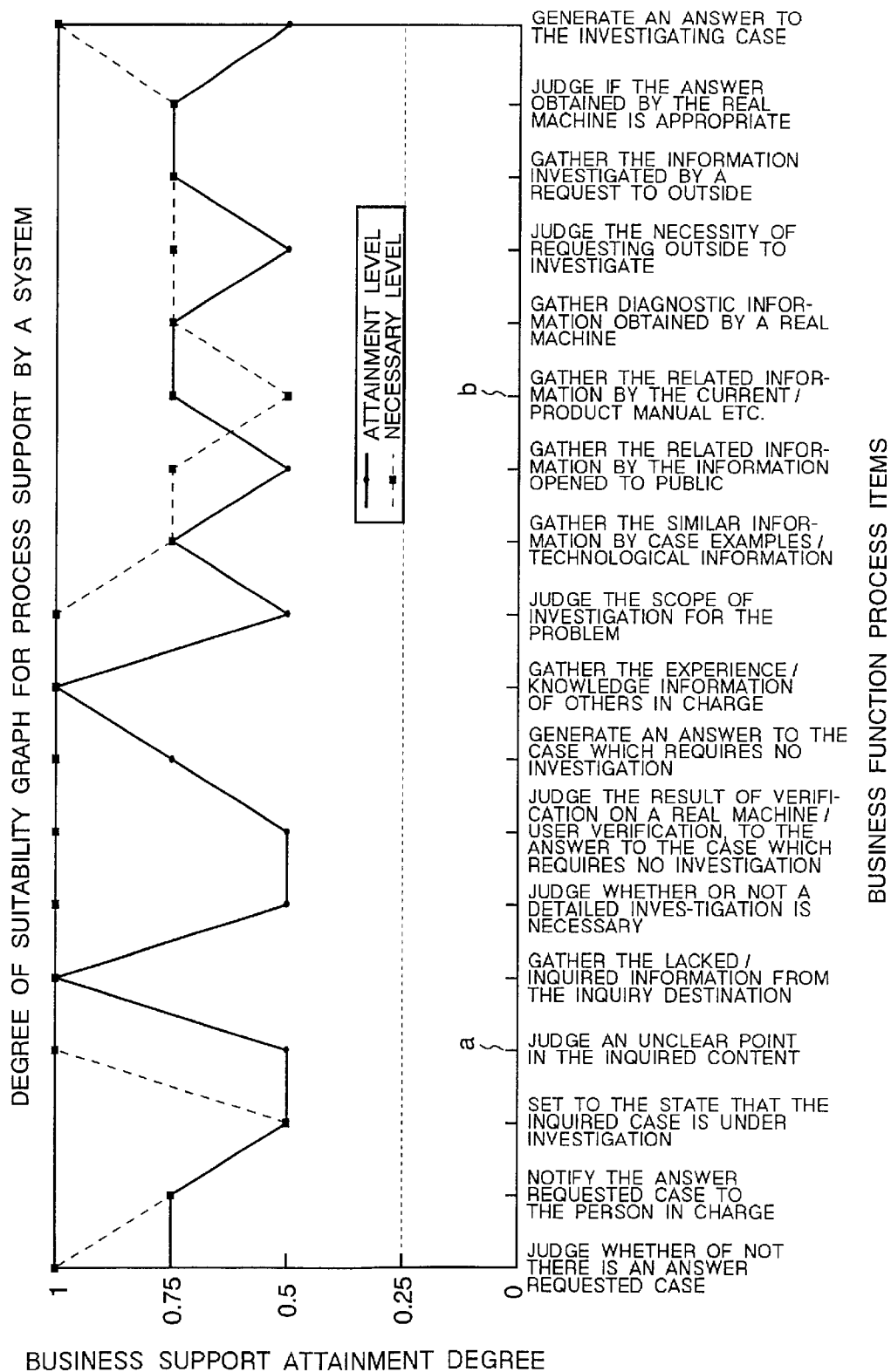
FIG. 19 is an explanatory diagram showing an example of a graph of the degree of suitability for process support by a system.

When the graph 1705 of the suitability degree of the business support is selected, a broken line graph of the necessary level and the attainment level of support with respect to each functional process item as shown in FIG. 19 is displayed. In the example of FIG. 19, in the system to be evaluated, it will be understood that while the necessary level of the functional process item of "judge an unclear point in the contents of the inquiry" (refer to the arrow "a" in FIG. 19) is 1.0, the attainment level of support is only 0.5. On the contrary, with respect to the functional process item of "gather the related information from book/product manual" (refer to the arrow "b" in FIG. 19), it will be understood that the attainment level is as excessive as 0.75 while the necessary level is 0.5. As mentioned above, the excessiveness and deficiency of the support to a business is visually displayed.

Figure 20:
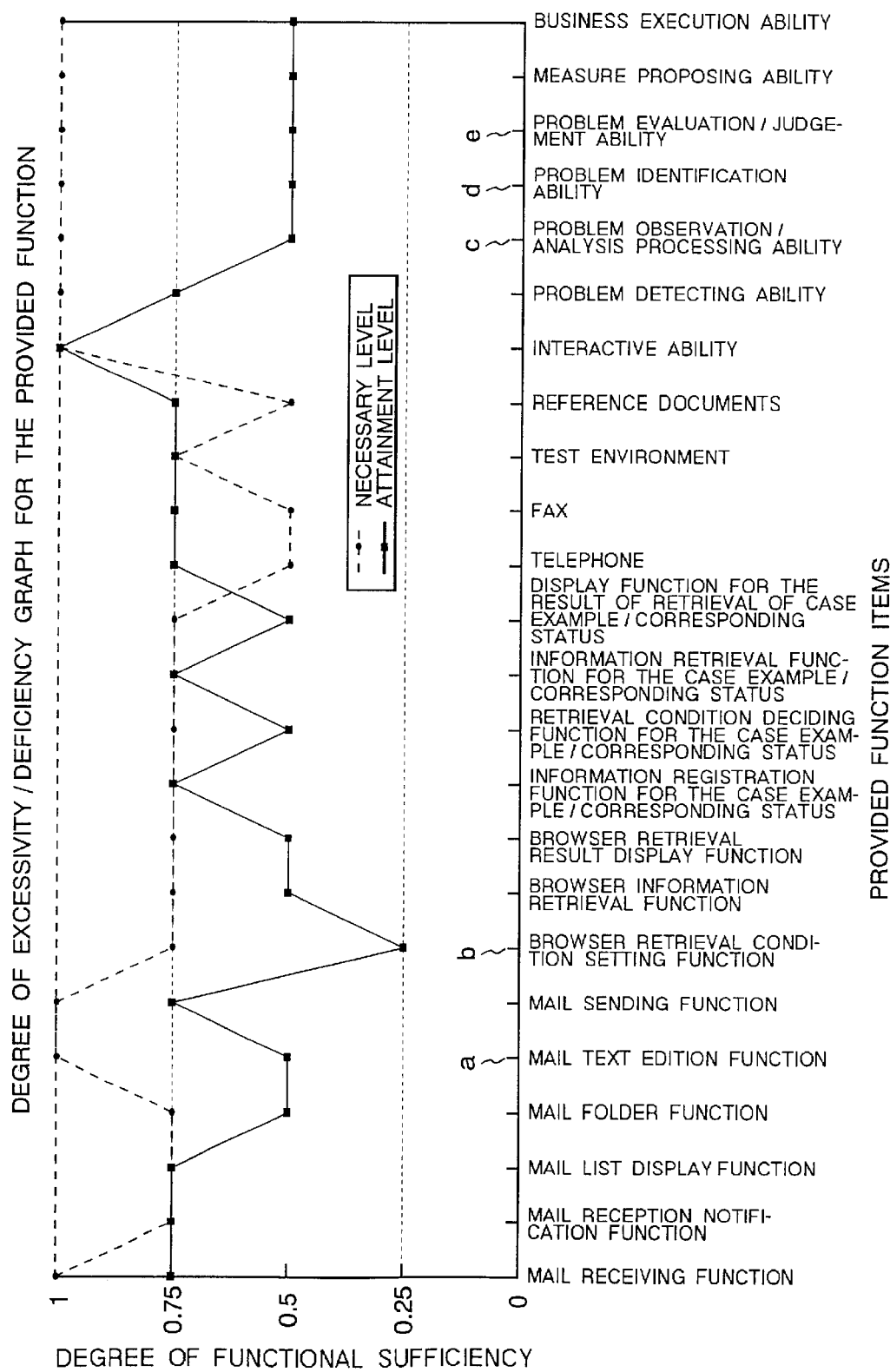
FIG. 20 is an explanatory diagram showing an example of a graph for the degree of excessiveness/deficiency of the provided function.

When the graph 1706 of the degree of excessiveness/deficiency for the provided function is selected, a broken line graph of the necessary level and the attainment level of the functional sufficiency with respect to each provided functional item as shown in FIG. 20 is displayed. In the example of FIG. 20, not only the functional deficiency of the information resources such as an electronic mail text editing function (refer to the arrow "a" in FIG. 20) and a browser retrieval condition setting function (refer to the arrow "b" in FIG. 20) but also the deficiency or excessiveness of a functional item of a provided resource such as the problem observation/analysis processing ability of a help desk operator (refer to the arrow "c" in FIG. 20), the problem identification ability (refer to the arrow "d" in FIG. 20), or the problem evaluating/judging ability (refer to the arrow "e" in FIG. 20) are visually displayed.

Figure 21:
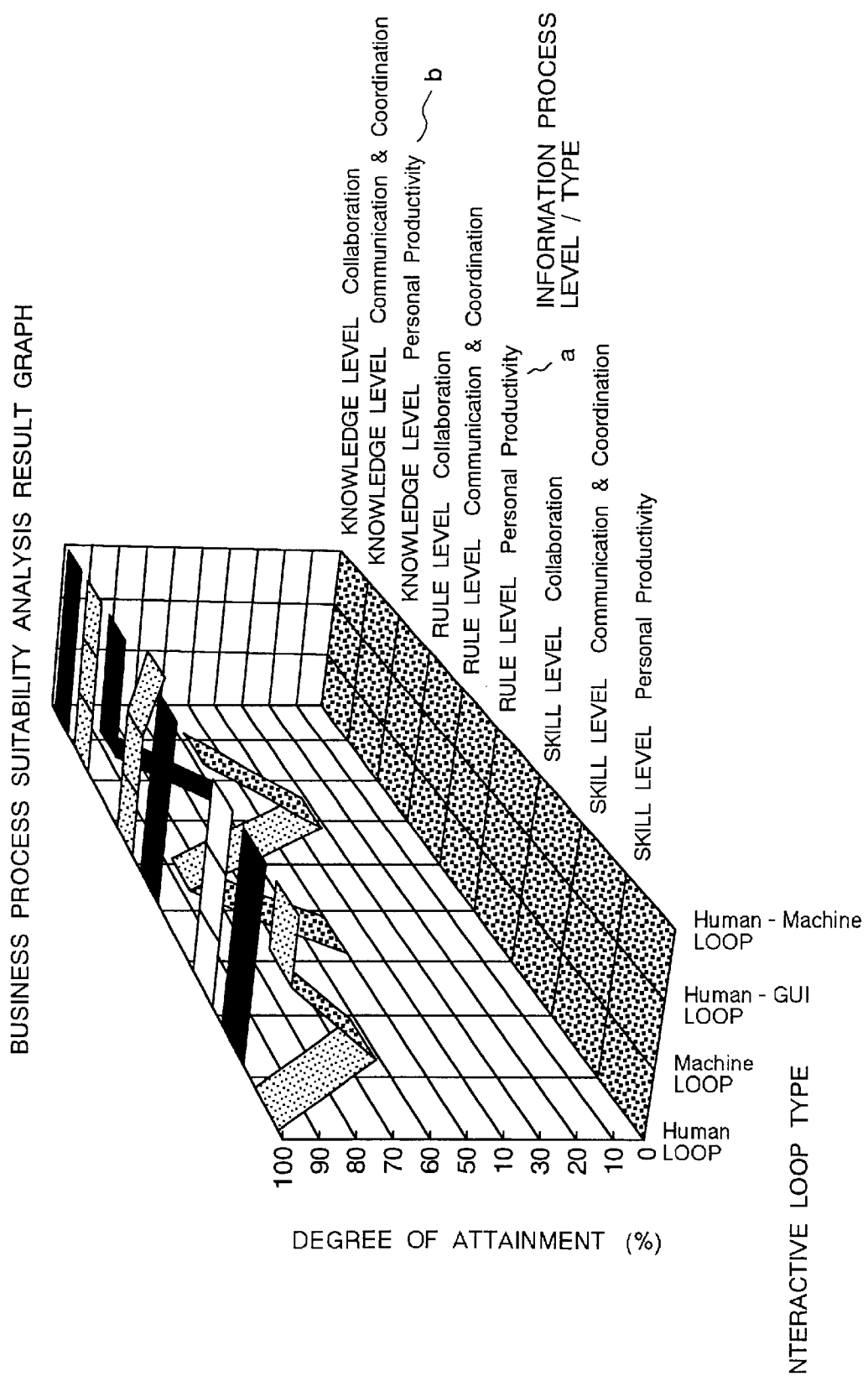
FIG. 21 is an explanatory diagram showing an example of a business process suitability analysis result graph.

When the suitability analysis graph 1707 is selected, the analysis result of the particulars of the suitability from the viewpoints of the information processing level/type and the interactive loop type is displayed by a three-dimensional broken line graph as shown in FIG. 21. In the example of FIG. 21, for example, it is shown that each of the functional processing items (refer to the arrows "a" and "b" in FIG. 21) regarding the personal productivity at the rule level and the knowledge level has a low degree of attainment with respect to the human loop. From such a display, which type of support is deficient is shown in such a manner that the computerizataion support for the proceeding and judging processes executed by an operator at present are necessary.

The CPU 117 then receives an instruction from a window close instruction button (not shown), closes the evaluation result graph window, and returns to the display of the display mode designation window (step 1407). In such a state, the system waits for the next instruction. The operator can see another result or can finish the process. The instruction can be given by using the mouse 115. When the designation is executed on the display mode designation window, the CPU 117 executes the above-mentioned displaying process in accordance with the designation (step 1408). On the other hand, when the end button 1708 is depressed by the mouse 115, the process is finished (step 1409).

Figure 22:
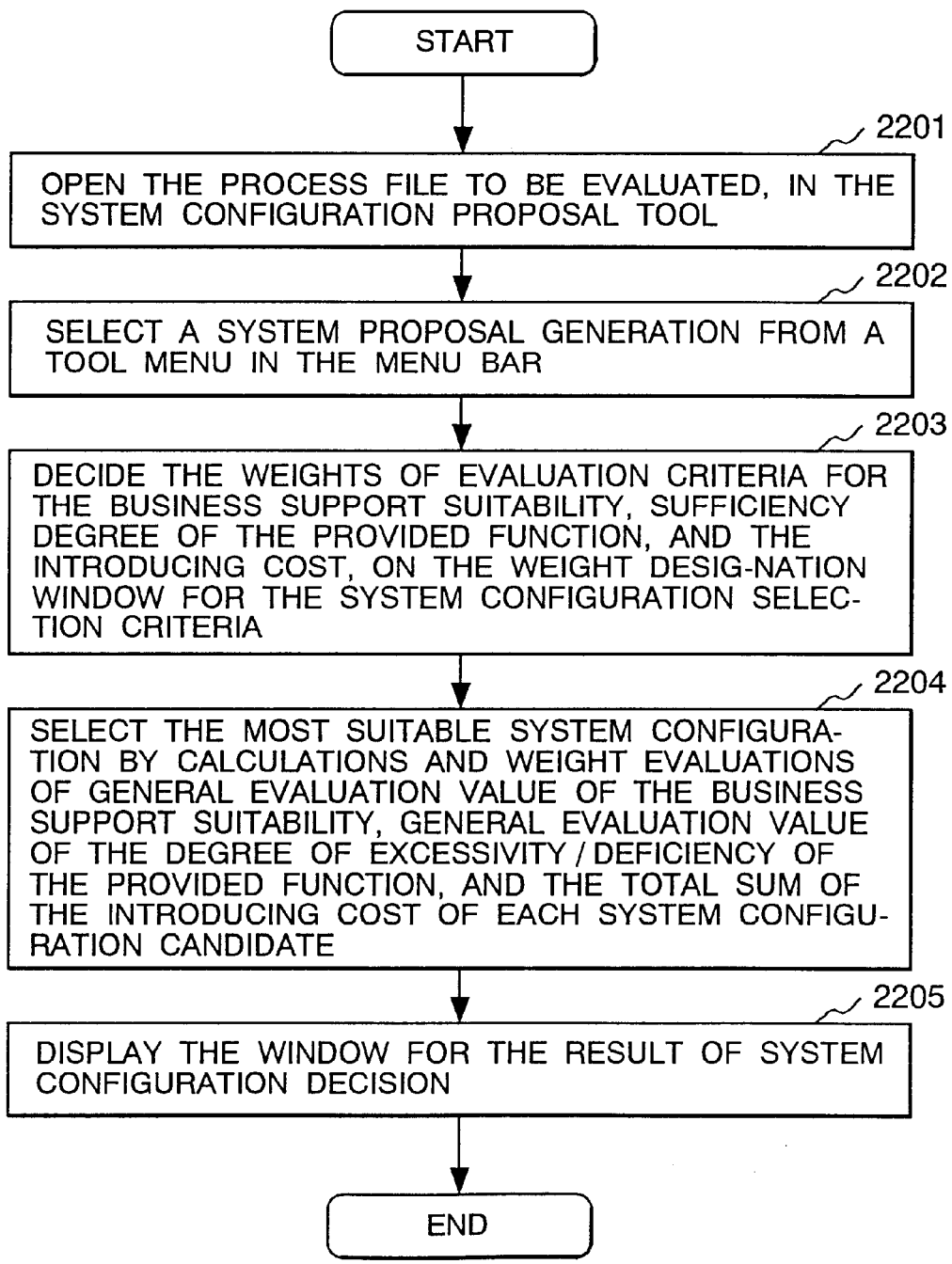
FIG. 22 shows an operational flow for the system configuration proposal process.

Subsequently, the system configuration proposal process will be executed by the proposal system configuration decision program 109. FIG. 22 shows an operation flow of the system configuration proposal process.

Figure 23:
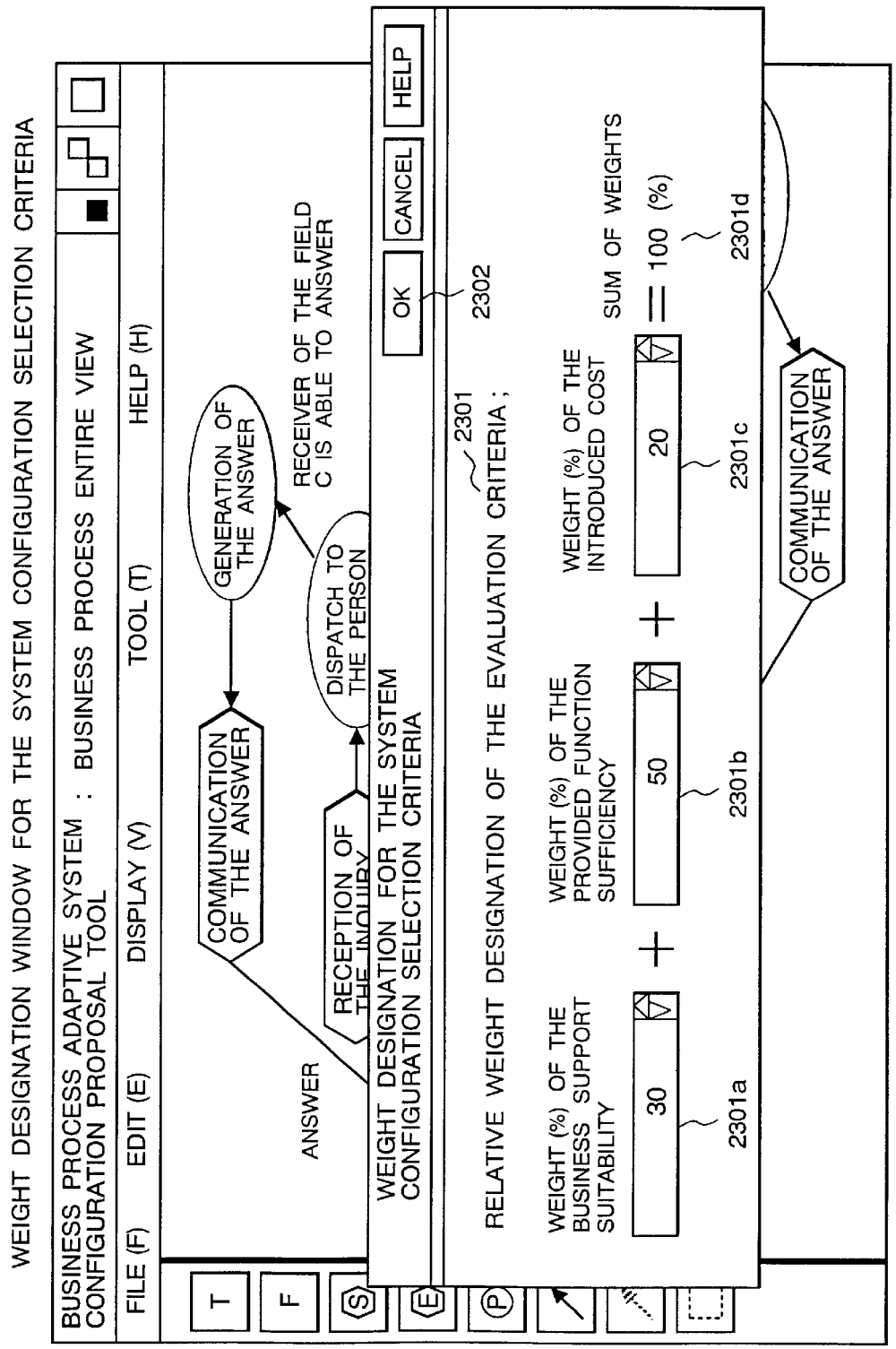
FIG. 23 is an explanatory diagram showing an example of a weight designation window for the system configuration selection criteria.

The CPU 117 displays the initial window of the system configuration proposal tool shown in FIG. 3, receives the designation of the process file to be evaluated, and opens the process file (step 2201). When the system proposal generation 307 is selected by the mouse 115 from the tool menu (T) in the menu bar 300a, the CPU 117 receives the selection (step 2202). Consequently, a weight designation window for the system configuration selection criteria as shown in FIG. 23 is displayed. In FIG. 23, the region of relative weight designation 2301 of the evaluation criteria is displayed. In the region, regions for designating the relative weights regarding the three selection criteria of business support suitability 2301a, provided function sufficiency 2301b, and introducing cost 2301c when the proposal system is selected from the system configuration candidates are provided. Those are described so as to ex-press an addition equation and the "sum of weights" 2301d is displayed.

The operator sets the relative weights of the three selection criteria of the business support suitability 2301a, the provided function sufficiency 2301b, and the introducing cost 2301c when the proposal system is selected from the system configuration candidates so as to be equal to 100(%) in total. The CPU 117 receives the setting and, after the setting, receives an acknowledgment by the depression of the OK button 2302 (step 2203).

After that, the CPU 117 calculates a general evaluation value of the business support suitability, a general evaluation value of the degree of excessiveness/deficiency of the provided function, the total sum of the introducing cost of each system configuration candidate, and a general evaluation value of weighting. The CPU decides the system configuration having the highest general evaluation value as a most suitable system configuration and prioritizes the other system configurations in accordance with the order from the highest general evaluation value (step 2204).

When the total number of function process items is set to (n), the general evaluation value MT' of the business support suitability of the system configuration candidate is calculated by the following equation.

$$MT' = \sum_{t=1}^{n} \{\min(mT'(t)/mT(t), 1)\}/n \quad \text{[Equation 4]}$$

When the total number of provided function items is set to (m), the general evaluation value MF' of the provided function excessiveness and deficiency is calculated by the following equation.

$$MF' = \sum_{f=1}^{m} \{\min(mF'(f)/mF(f), 1)\}/m \quad \text{[Equation 51]}$$

The introducing cost sum MC' is derived by obtaining the sum of the prices in the resource attribute 402 of the provided function item which has been defined before. In order to obtain a general evaluation value P(c) of the weights of (X) existing system configuration candidates (c), first, a general evaluation value rsT'(c) of relatively normalized business support suitability, a general evaluation value rsF' (c) of a relatively normalized provided function excessiveness/deficiency, and a relatively normalized introducing cost evaluation value rsC'(c) are calculated by the following equations, respectively.

$$rsT'(c) = MT'(c) \bigg/ \sum_{i=1}^{x} MT'(i) \quad \text{[Equation 6]}$$

$$rsF'(c) = MF'(c) \bigg/ \sum_{i=1}^{x} MF'(i) \quad \text{[Equation 7]}$$

$$rsC'(c) = \{1/MC'(c)\} \bigg/ \sum_{i=1}^{x} \{1/MC'(i)\} \quad \text{[Equation 8]}$$

Then the weighting general evaluation value P(c) is derived by the following equation using a weight wT' of the business support suitability, a weight wF' of the provided function sufficiency, and a weight wC, of the introducing cost as the selection criteria.

$$P(c) = wT' \times rsT'(c) + wF' \times rsF'(c) + wC' \times rsC'(c) \quad \text{[Equation 9]}$$

For instance, it is assumed that there are three system configuration candidates of help desk systems 1, 2, and 3. For the help desk system 1, MT'(1)=0.74, MF'(1)=0.75, and MC'(1) 1,500,000 yen. For the help desk system 2, MT'(2) 0.45, MF'(2)=0.65, and MC' (2)=1,000,000 yen. For the help desk system 3, MT'(3)=0.95, MF'(3)=0.65, and MC'(3)=3,000,000 yen- When the weights of the selection criteria wT' 0.5, wF'=0.2, and wC'=0.3, the relatively normalized evaluation values are as follows; rsT'(1) 0.35, rsF'(1)=0.36, rsC' (1)=0.34, rsT'(2)=0.21, rsF'(2)=0.32, rsC'(2)=0.50, rsT'(3)= 0.44, rsF'(3)=0.32, and rsC'(3) 0.16. The general evaluation values are P(1) 0.35, P(2)=0.32, and P(3)=0.33. Consequently, the help desk system 1 is selected as the most suitable system configuration.

After determining the system configuration, the CPU 117 displays a system configuration proposal result display window 2401 as shown in FIG. 24 (step 2205). In the window, the system configuration candidates are presented in the priority order.

By the above-mentioned configuration and operation, the business functional process items can be inductively led without any omissions by the role transition definition method from the business process map and the definition method having uniformity using the information frame. By deducing the functional process items, the functional suitability between the business support suitability and the provided function excessiveness/deficiency can be evaluated by a simple mapping operation based on the association with the functional items provided by the system including a human. Consequently, the support to the new system configuration proposal by which the functional support effects suited to the business is obtained can be realized. Further, by the means for analyzing the suitability with respect to each of the type and level of the information processing and the type of the interactive processing and the means for visually displaying the suitability evaluation result and the analysis result by a graph, the result information such as the degree of the support effect on the business process, the business process item and type to which the support is excessive or short, the degree of the functional excessiveness/deficiency of the system configuration candidate, the functional item to which the support is excessive or short, and the effect of the resource processing ability of the human resource can be provided in a mode having a high readability. Further, by the proposal system determining means in which the functional suitability and the cost are used as selection criteria and the user can set the weighting of each criterion, the system configuration having the best investment effect in which the preference of the user is reflected can be selected.

A second embodiment of the invention will be described. In the embodiment, a case of evaluating the functional suitability to the business process to which the existing system is applied and proposing an improved system will be described with reference to FIGS. 9, 14, and 22.

The system configuration and operation are basically similar to those of the foregoing first embodiment except for the following point. In the operation flow of the definition of the system configuration candidate and the association process to the process shown in FIG. 9, the existing system configuration instead of the system configuration candidate is defined and associated and the operation for performing the evaluation and analysis process for the functional suitability shown in FIG. 14 is performed. The second embodiment will be described mainly by the different point hereinbelow.

In the embodiment, first, the process shown in FIG. 14 is performed and an evaluation/analysis result graph is displayed. By the evaluation/analysis result graph, points to be improved of the existing system such as an excessive/deficient point of the support, an excessive/deficient point of the provided function, and a point which requires support with respect to each of the type and level of information processing and the type of interactive processing are specified.

Subsequently, the system configuration candidate as a measure to the improvement points is defined by a similar positioning as that of the new system configuration candidate in the first embodiment and the functional suitability evaluation/analysis operation regarding the improved system configuration candidate is executed again. Further, the system configuration proposal processing operation shown in FIG. 22 is performed in a manner similar to the first embodiment. As the result of the system configuration decision, the most suitable improved system configuration is selected from the improved system configuration candidates.

By the configuration and operation as mentioned above, also when the improvement of the existing system is proposed, the proposal can be supported by using means similar to that in the case of the new system configuration proposal.

As a third embodiment of the invention, a case of commonly using past new system configuration proposal, system improvement proposal information, and resource library information as samples among the users will be described by using FIG. 25.

Figure 25:
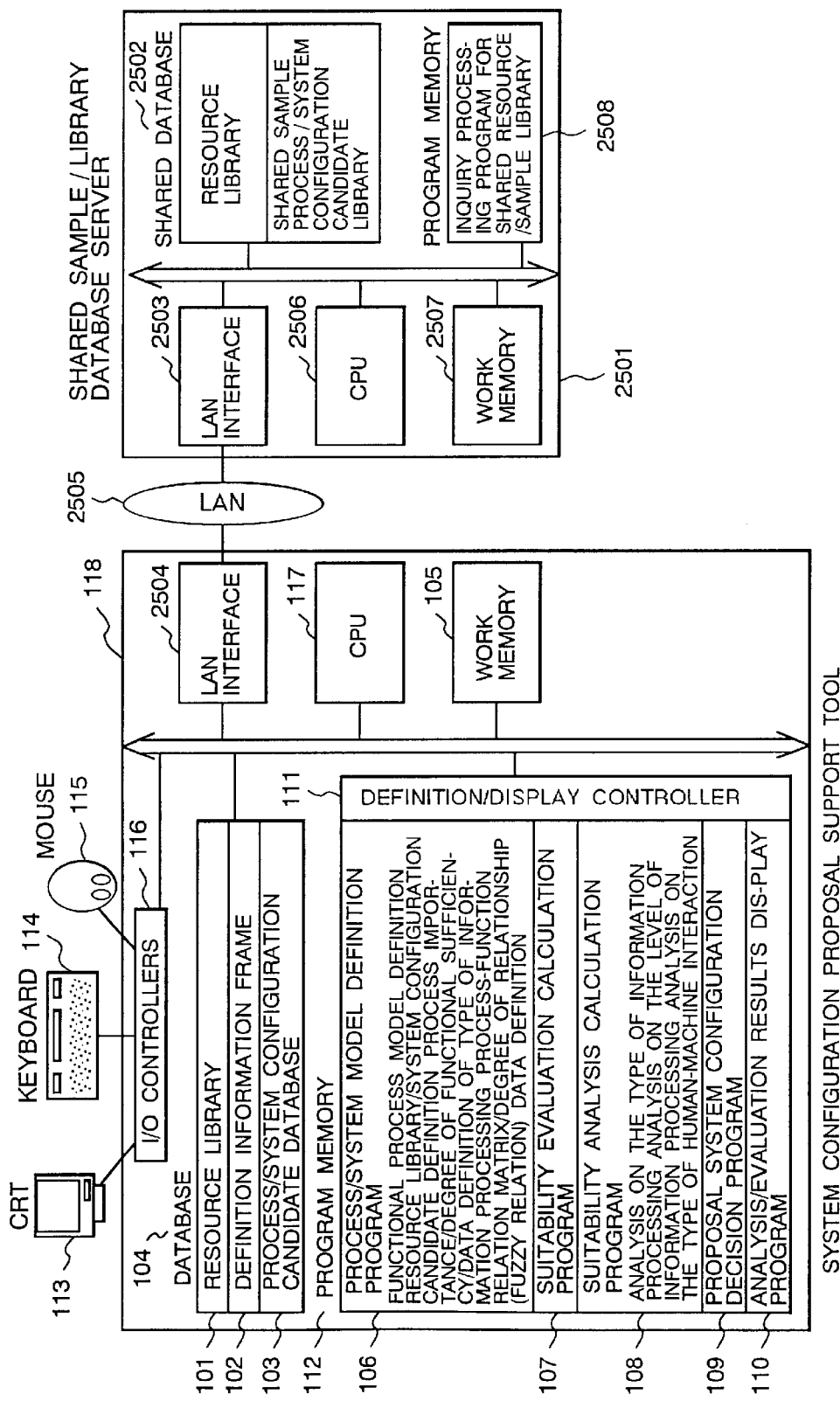
FIG. 25 is a block diagram showing the configuration of a support tool for the sample shared system configuration proposal according to the invention.

FIG. 25 is a diagram showing a support tool configuration for the sample shared system configuration proposal. The system operation is basically similar to those in the first and second embodiments except for the following point. In the third embodiment, in the configuration as shown in FIG. 25, a shared sample/library database server 2501 is provided, a LAN interface 2504 is also provided for the body 118 of an information processor, and information can be transferred/received between the server 2501 and the information processor body 118 via the LAN interface 2505. In the server 2501, a shared database 2502, a LAN interface 2503, a CPU 2506, a work memory 2507, and a program memory 2508 are provided. In the shared database 2502, the resource library and process/system configuration candidates which have been defined, evaluated, and proposed in the past are registered as samples and can be commonly used by a plurality of users. This point is different from the first and second embodiments.

In the third embodiment, when each user opens the process file to be evaluated by his system configuration proposal support tool 118, the user accesses the shared sample/library database server 2501 via the LAN 2505 by using the LAN interfaces 2504 and 2504, retrieves and refers to a shared information file on the shared database 2502 by the CPU 2506, the work memory 2507, and the inquiry processing program 2508 for shared resource/sample library on the server side, selects a shared information file similar to the file to be evaluated, copies the selected file to the database 104 on his system configuration proposal support tool 118, corrects the contents of the shared information file in accordance with the file to be evaluated, and re-uses the corrected information, thereby realizing the definition of the process/system configuration candidate.

By commonly re-using the past system configuration proposal sample information by the configuration and operation as mentioned above, the amount of definition and a definition load of the tool user can be reduced when a new system is proposed, and the knowledge of the past system configuration proposal can be effectively used.

In the third embodiment, the information processor body 118 can be a portable computer having a communication function. In this case, the computer accesses to the server 2501 via a communication means such as internet, necessary information is fetched, and the process can be performed.

As a fourth embodiment of the invention, a case of carrying and using the shared resource/sample information for proposing the system configuration will be described with reference to FIG. 26.

Figure 26:
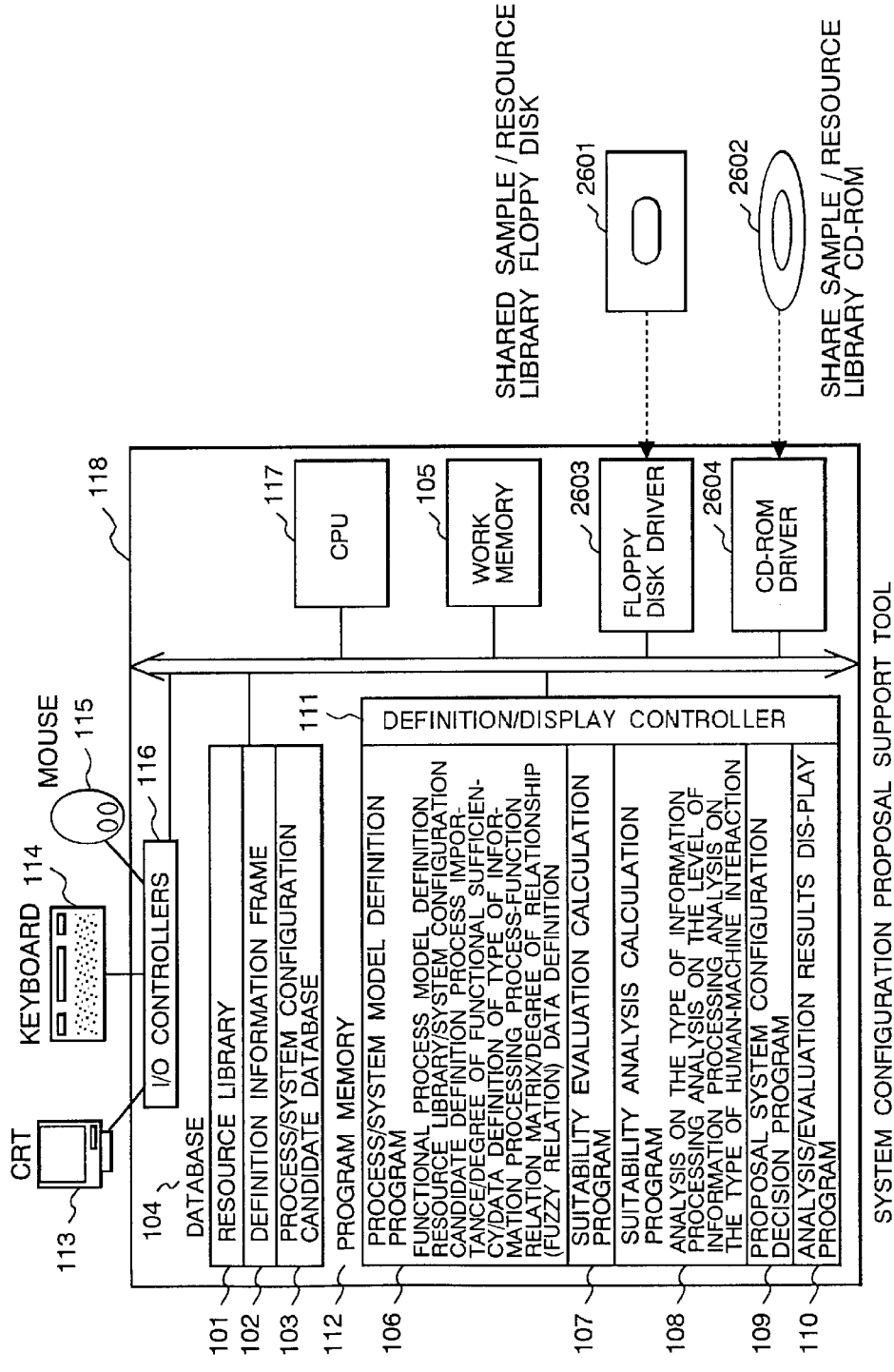
FIG. 26 is a block diagram showing the configuration of a support tool for the system configuration proposal using portable samples according to the invention.

FIG. 26 is a diagram showing a support tool configuration for the system configuration proposal using portable samples. The system operation is basically similar to those in the first, second, and third embodiments except for the following point. As shown in FIG. 26, the information processor body 118 is provided with a floppy disk driver 2603 and a CDROM driver 2604. A floppy disk 2601 for storing the shared sample/resource library or a CD-ROM 2602 for storing the shared sample/resource library is referred to for the past system configuration proposal sample information. By using a rewritable medium as a storage medium, the past system configuration proposal sample information is stored in the medium and the shared sample/resource library can be configurated. The shared sample/resource library can be also updated by registering new information.

Consequently, the past system configuration proposal sample information is carried, and the sample information can be referred to, corrected and re-used in a manner similar to the third embodiment on the system configuration proposal support tool having therein the floppy disk driver 2603 or CD-ROM driver 2604.

In the embodiment, the information processor body 118 can also be constructed by a portable computer such as a notebook-type personal computer having therein the floppy disk driver or CD-ROM driver. Consequently, the past system configuration proposal sample information can be carried and used. In case of proposing the system configuration or consulting on the system configuration at a destination such as a customer's place, the past system configuration proposal sample information can be effectively utilized by using the system configuration proposal support tool on the notebook-type personal computer, so that high-quality proposal and consultation service can be provided.

According to the embodiments of the invention as mentioned above, the functional support effect of the system on the business process to which the system is applied can be evaluated in the system effect estimation and configuration proposal at the planning stage of the configuration and improvement of the information system. Consequently, the system configuration evaluation method which can systematically derive the excessive/deficient point in the business support and that in the functions provided by the system and can evaluate the functional suitability and the system configuration proposal support tool which can determine the system configuration having the provided functional items suited to the business process on the basis of the investment effects and the preference of the introducer regarding the system selection criteria can be provided. Especially, different from the conventional information system for automatization to realize rationalization and reduction in the number of workers, the invention is effective on evaluation of the effects of the support system information system which executes the business in cooperation with a human and the proposal of the system configuration.

Since the functional suitability can be evaluated and the past system configuration proposal sample can be commonly used, the user or system engineer who examines the system configuration proposal can select necessary tools from a group of various tools and components as candidates, the work load of configurating the system is reduced, and the system configuration proposal can be supported by effectively and efficiently selecting tools and components.

Further, the system configuration proposal suitable to each business process to which the system is applied is supported in consideration of the investment effects and the preference of the introducer regarding the system selection criteria, and the results can be displayed by a visual graph having high visibility. In the information system configuration consulting and SI support at a customer's place or the like, therefore, if the floppy disk or CD-ROM in which the system configuration proposal support tools and the shared sample/resource library are registered is carried and used, there is an effect such that the medium can be utilized as a strong tool for providing a solution made for the customer in order to increase the customer's satisfaction.

According to the invention, the effect evaluation of the support system for enhancing the business processing ability of a human and the system configuration proposal suitable to the business process can be supported. Further, the influences of the support information system and the ability of the related worker on the business process can be quantitively evaluated.

The invention claimed is:

1. A system configuration proposal method in an information processing system comprising an information processor, an information storage, and an input/output device, comprising the steps of:

defining a business process model expressing a business process whose system configuration is to be proposed, by a combination of functional processing items defined within an information frame and storing the business process model in said information storage by said information processor;

setting the degree of importance of each functional processing item in said business process model by said information processor;

defining a candidate of a system resource for carrying out said business process as a combination of functional items provided by said system resource and storing the candidate in said information storage by said information processor;

setting the degree of functional sufficiency of each functional item provided by said system resource by said information processor;

setting the degree of relationship between each of the functional processing items of said business process model and the functional items provided by said system resource by said information processor;

calculating the degree of functional suitability of the candidate of said system resource on the basis of said degree of relationship, the degree of importance of the functional processing items of said business process model, and the degree of functional sufficiency of the functional items provided by said system resource by said information processor, said degree of functional suitability being equal to a difference between a degree of attainment and said degree of importance and said degree of attainment being equal to a calculated value obtained by a mapping function relating said degree of relationship and said degree of functional sufficiency; and determining said system configuration proposal by the candidate of said system resource on the basis of evaluation indices including said functional suitability.

2. A method according to claim 1, wherein said system resource comprises:

at least one of an information system used for carrying out said business process and a human resource.

3. A method according to claim 1, wherein said degree of relationship, the degree of importance of the processing item of said business process model, and the degree of functional sufficiency of the functional items provided by said system resource comprise numerical information.

4. A method according to claim 1, further comprising:

a step of generating an evaluation window in a display mode designated on the basis of said evaluation indices and outputting the window by said input/output device.

5. A method according to claim 1, wherein said information frame comprises a 5W1H frame.

6. A system configuration proposal method in an information processing system comprising an information processor, an information storage, and an input/output device, comprising the steps of:

defining a functional process model expressing a processing item of a business process whose system configuration is to be proposed, by a combination of items in a basic function element unit of information processing and storing the functional process model in said information storage by said information processor, said items in a basic function element unit being defined within an information frame;

setting the degree of importance of each basic function element item of said functional process model by said information processor;

defining a candidate of a system resource for carrying out said functional process by a combination of functional items provided by said system resource and storing the candidate in said information storage by said information processor;

setting the degree of functional sufficiency of each functional item provided by said system resource by said information processor;

setting the degree of relationship between each of the basic function element items of said functional process model and the functional items provided by said system resource by said information processor;

calculating the degree of functional suitability of the candidate of said system resource by said information processor on the basis of said degree of relationship, the degree of importance of the basic function element item of said functional process model, and the degree of functional sufficiency of said functional items provided by said system resource, said degree of functional suitability being equal to a difference between a degree of attainment and said degree of importance and said degree of attainment being equal to a calculated value obtained by a mapping function relating said degree of relationship and said degree of functional sufficiency; and determining said system configuration proposal by the candidate of said system resource on the basis of evaluation indices including said functional suitability.

7. A method according to claim 6, wherein said system resource comprises:

at least one of an information system used for carrying out said functional process and a human resource.

8. A method according to claim 6, wherein said degree of relationship, the degree of importance of the basic function element item of said functional process model, and the degree of functional sufficiency of the functional items provided by said system resource comprise numerical information.

9. A method according to claim 6, wherein the step of calculating the degree of functional suitability of the candidate of said system resource further comprises the step of:
  calculating the necessity of each functional item provided by said system resource by the mapping operation by a reverse mapping function using the degree of importance of the basic function element item of said functional process model and said degree of relationship.

10. A method according to claim 9, further comprising the steps of:
  generating an evaluation window showing the suitability to the basic function element item of said functional process model by the difference between said calculated degree of attainment and the degree of importance with respect to the basic function element item of said each functional process; and
  generating an evaluation window showing the degree of excessiveness/deficiency of each provided functional item by the difference between said calculated degree of necessity and the degree of sufficiency with respect to each functional item provided by said system resource.

11. A method according to claim 9, wherein said degree of relationship is a relationship matrix of the basic function element items of said functional process model and the functional items provided by said system resource.

12. A method according to claim 6, wherein the basic function element item of said functional process model comprises:
  a process for grouping the basic function element items of each of said functional processes into types of individual work, group communication, group coordination, and group collaboration;
  a process for totalling and normalizing the basic function element items of each functional process on said group unit basis; and
  a process for calculating the functional suitability of each information processing type.

13. A method according to claim 6, wherein the basic function element item of said functional process model comprises:
  a process for grouping the basic function element items of each of said functional processes into information processing levels of a skill level, a rule level, and a knowledge level;
  a process for totalling and normalizing the suitability of the basic function element items of each functional process on said group unit basis; and
  a process for calculating a value relating to evaluation of the functional suitability at each information processing level.

14. A method according to claim 6, wherein the basic function element item of said functional process model comprises:
  a process for grouping the basic function element items of said each functional process into mutual action (interactive loop) types of human and information systems for a business process, of a human loop, a machine loop, a human-GUI loop, and a human-machine loop;
  a process for totalling and normalizing the suitability of the basic function element items of each functional process on said group unit basis; and
  a process for calculating a value relating to evaluation of the functional suitability of each of said interactive loop types.

15. A method according to claim 6, further comprising:
  a step of generating an evaluation window in a display mode designated on the basis of said evaluation indices and outputting the window by said input/output device.

16. A method according to claim 6, wherein said information frame comprises a 5W1H frame.

17. A system configuration proposal tool comprising:
  an information processor;
  an information storage;
  an input/output device;
  means for defining a business process model expressing a business process whose system configuration is to be proposed, by a combination of functional processing items defined within an information frame and storing the business process model in said information storage by said information processor;
  means for setting the degree of importance of each functional processing item of said business process model by said information processor;
  means for defining a candidate of a system resource for carrying out said business process by a combination of functional items provided by said system resource and storing the candidate in said information storage by said information processor;
  means for setting the degree of functional sufficiency of each functional item provided by said system resource by said information processor;
  means for setting the degree of relationship between each of the processing functional items of said business process model and the functional items provided by said system resource by said information processor;
  means for calculating the degree of functional suitability of the candidate of said system resource by said information processor on the basis of said degree of relationship, the degree of importance of the processing item of said business process model, and the degree of functional sufficiency of the functional items provided by said system resource, said degree of functional suitability being equal to a difference between a degree of attainment and said degree of importance and said degree of attainment being equal to a calculated value obtained by a mapping function relating said degree of relationship and said degree of functional sufficiency; and
  means for executing a function of determining said system configuration proposal by the candidate of said system resource on the basis of evaluation indices including said functional suitability.

18. A system configuration proposal tool according to claim 17, further comprising:
  means for executing a function of generating an evaluation window in a display mode designated on the basis of said evaluation indices and outputting the window by said input/output device.

19. A tool according to claim 17, wherein said information frame comprises a 5W1H frame.

20. A system configuration proposal tool comprising:
  an information processor;
  an information storage;
  an input/output device;
  means for defining a functional process model expressing functional processing items of a business process whose system configuration is to be proposed, by a combination of items in a basic function element unit basis of information processing and storing the functional process model in said information storage by said information processor, said items in a basic function element unit being defined within an information frame;

means for setting the degree of importance of each of the basic function element items of said functional process model by said information processor;

means for defining a candidate of a system resource for carrying out said functional process as a combination of functional items provided by said system resource and storing the candidate in said information storage by said information processor;

means for setting the degree of functional sufficiency of each functional item provided by said system resource by said information processor;

means for setting the degree of relationship between each of the basic function element items of said functional process model and the functional item provided by said system resource by said information processor;

means for calculating the degree of functional suitability of the candidate of said system resource by said information processor on the basis of said degree of relationship, the degree of importance of the basic function element item of said functional process model, and the degree of functional sufficiency of the functional items provided by said system resource, said degree of functional suitability being equal to a difference between a degree of attainment and said degree of importance and said degree of attainment being equal to a calculated value obtained by a mapping function relating said degree of relationship and said degree of functional sufficiency; and means for executing a function of determining said system configuration proposal by the candidate of said system resource on the basis of evaluation indices including said functional suitability.

21. A tool according to claim 20, wherein the means for defining said functional process model further comprises:

a first function means of defining a status process model expressing a status transition of each processing item of the business process from said business process model as a lower layer of the business process model;

a second function means of hierarchically defining in detail the processing item executed in each status of said status process model and its transition as a functional process model and as a lower layer of the status process model; and a function means of supporting so as to inductively and systematically lead the functional process model by causing said second function means to execute after said first function means has executed.

22. A tool according to claim 20, wherein the function means of determining said system configuration proposal further comprises:

means for using business suitability, a degree of excessiveness/deficiency of the function of the provided function item, and a system introducing cost as criteria for selecting the system configuration and for interactively setting a relative weight of each criterion by the user of the tool, thereby enabling the system configuration in which preference of the system introducer is reflected to be realized.

23. A system configuration proposal tool according to claim 20, further comprising:

means for executing a function of generating an evaluation window in a display mode designated on the basis of said evaluation indices and outputting the window by said input/output device.

24. A tool according to claim 23, wherein the function means of generating said evaluation window and outputting the window by said input/output device further comprises:

means for visually displaying the degree of functional suitability by a graph; and means for grouping the results of business suitability and a degree of excessiveness/deficiency of functions of provided functional items in accordance with the difference between a necessary level and an attainment level and identifying and displaying the particulars of the degree of excessiveness/deficiency of the functions by a bar graph.

25. A tool according to claim 23, wherein the function means of generating said evaluation window and outputting said evaluation window by said input/output device further comprises:

means for visually displaying the functional suitability by a graph; and means for displaying the results of business suitability of each functional process element item and the sufficiency of a degree of excessiveness/deficiency of the provided function of the system providing function item by a broken line graph expressing a necessary level and an attainment level.

26. A tool according to claim 23, wherein the function means of generating said evaluation window and outputting it by said input/output device further comprises:

means for visually displaying the functional suitability by a graph; and means for displaying the evaluation result of support suitability with respect to each of the level and type of information processing and the type of the interactive processing by a broken line graph using axes of the types.

27. A tool according to claim 20, wherein the function means of determining said system configuration proposal further comprises:

means for prioritizing the system configurations in accordance with a ranking of the systems configurations based on the values of at least one of the performance indices from a good evaluation result having higher value performance indices and displaying the result.

28. A tool according to claim 20, further comprising:

a database server in which process model/system configuration candidate information as shared sample information in the event of said system configuration proposal is classified into the business process types and is registered; and means for using or re-using the sample information as a sample by connecting a plurality of system configuration proposal tools to the server via a network.

29. A tool according to claim 20, wherein said information frame comprises a 5W1H frame.

30. A program product which is used by an information processing system comprising an information processor, an information storage, and an input/output device, comprising an information storage medium which can be read by said information processing system and stores programs for executing the following processes:

a process for defining a business process model expressing a business process whose system configuration is to be proposed, by a combination of functional processing items defined within an information frame and storing the business process model in said information storage by said information processor;

a process for setting the degree of importance of each of the functional processing items of said business process model by said information processor;

a process for defining a candidate of a system resource for carrying out said business process as a combination of functional items provided by said system resource and storing the candidate in said information storage by said information processor;

a process for setting the degree of functional sufficiency of each functional item provided by said system resource by said information processor;

a process for setting the degree of relationship between each of the functional processing items of said business process model and the functional items provided by said system resource by said information processor;

a process for calculating the degree of functional suitability of the candidate of said system resource by said information processor on the basis of said degree of relationship, the degree of importance of the functional processing item of said business process model, and the degree of functional sufficiency of the functional items provided by said system resource, said degree of functional suitability being equal to a difference between a degree of attainment and said degree of importance and said degree of attainment being equal to a calculated value obtained by a mapping function relating said degree of relationship and said degree of functional sufficiency; and a process for determining said system configuration proposal by the candidate of said system resource on the basis of evaluation indices including said functional suitability.

31. A program product according to claim 30, further comprising:

a process for generating an evaluation window in a display mode designated on the basis of said evaluation indices and outputting it by said input/output device.

32. A program product according to claim 30, wherein said information frame comprises a 5W1H frame.

33. A program product which is used by an information processing system comprising an information processor, an information storage, and an input/output device, comprising an information storage medium which can be read by said information processing system and stores programs for executing the following processes:

a process for defining a functional process model expressing functional processing items of a business process whose system configuration is to be proposed, by a combination of items on a basic function element unit of information processing and storing the functional process model in said information storage by said information processor, said items in a basic function element unit being defined within an information frame;

a process for setting the degree of importance of each of the basic function element items of said functional process model by said information processor;

a process for defining a candidate of a system resource for carrying out said functional process as a combination of functional items provided by said system resource and storing the candidate in said information storage by said information processor;

a process for setting the degree of functional sufficiency of each of the functional items provided by said system resource by said information processor;

a process for setting the degree of relationship between each of the basic function element items of said functional process model and the functional items provided by said system resource by said information processor;

a process for calculating the degree of functional suitability of the candidate of said system resource by said information processor on the basis of said degree of relationship, the degree of importance of the basic function element items of said business process model, and the degree of functional sufficiency of the functional items provided by said system resource, said degree of functional suitability being equal to a difference between a degree of attainment and said degree of importance and said degree of attainment being equal to a calculated value obtained by a mapping function relating said degree of relationship and said degree of functional sufficiency; and a process for determining said system configuration proposal by the candidate of said system resource on the basis of evaluation indices including said functional suitability.

34. A program product according to claim 33, further comprising:

a process for generating an evaluation window in a display mode designated on the basis of said evaluation indices and outputting it by said input/output device.

35. A program product according to claim 33, wherein said information frame comprises a 5W1H frame.

* * * * *